US012694816B2

(12) United States Patent
Bae et al.

(10) Patent No.: US 12,694,816 B2
(45) Date of Patent: Jul. 28, 2026

(54) DISPLAY DEVICE PERFORMING MULTI-FREQUENCY DRIVING AND ELECTRONIC DEVICE

(71) Applicant: Samsung Display Co., LTD., Yongin-si (KR)

(72) Inventors: Jongman Bae, Yongin-si (KR); Woo-Chul Kim, Yongin-si (KR); Chaehee Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/007,910

(22) Filed: Jan. 2, 2025

(65) Prior Publication Data

US 2025/0372022 A1 Dec. 4, 2025

(30) Foreign Application Priority Data

Jun. 3, 2024 (KR) ........................ 10-2024-0072661

(51) Int. Cl.
*G09G 3/20* (2006.01)

(52) U.S. Cl.
CPC ....... *G09G 3/2092* (2013.01); *G09G 2310/08* (2013.01); *G09G 2320/0233* (2013.01); *G09G 2320/0247* (2013.01); *G09G 2320/0686* (2013.01); *G09G 2330/023* (2013.01); *G09G 2340/0435* (2013.01)

(58) Field of Classification Search
CPC ............. G09G 3/2092; G09G 2310/08; G09G 2320/0233; G09G 2320/0247; G09G 2320/0686; G09G 2330/023; G09G 2340/0435; G09G 3/3208; G09G 3/006; G09G 2310/0278; G09G 2310/04; G09G 2330/021; G09G 2330/12; G09G 2360/12
See application file for complete search history.

(56) References Cited

U.S. PATENT DOCUMENTS 7,903,047 B2 * 3/2011 Cummings .............. G09G 3/20 345/3.1
8,344,996 B2 * 1/2013 Lai ......................... G09G 3/344 345/94
9,489,882 B2 * 11/2016 Kim ..................... G09G 3/2092
(Continued)

FOREIGN PATENT DOCUMENTS

KR 1020210013475 A 2/2021
KR 1020210013477 A 2/2021
KR 1020220014373 A 2/2022

*Primary Examiner* — Jose R Soto Lopez
(74) *Attorney, Agent, or Firm* — CANTOR COLBURN LLP

(57) ABSTRACT

A display device includes a display panel, and a panel driver which drives the display panel. The panel driver receives a multi-frequency driving ("MFD") enable command from a host processor. In a first frame period, the panel driver receives a boundary setting command indicating a boundary between a first panel region and a second panel region of the display panel from the host processor. In a second frame period after the first frame period, the panel driver receives input image data for the first panel region from the host processor, does not receive the input image data for the second panel region from the host processor, drives the first panel region based on the input image data for the first panel region, and does not drive the second panel region.

19 Claims, 14 Drawing Sheets

(56) References Cited

U.S. PATENT DOCUMENTS

| | | | | |
|---|---|---|---|---|
| 10,176,139 | B2 * | 1/2019 | Keidar | G06F 9/5077 |
| 10,629,131 | B2 * | 4/2020 | Wang | G09G 3/2044 |
| 10,997,926 | B2 * | 5/2021 | Park | G09G 3/3233 |
| 2004/0027364 | A1 * | 2/2004 | Ohtani | H04M 1/576 345/699 |
| 2005/0206604 | A1 * | 9/2005 | Washio | G09G 3/3688 345/98 |
| 2012/0133659 | A1 * | 5/2012 | Masnikosa | G06T 15/005 345/522 |
| 2016/0180762 | A1 * | 6/2016 | Bathiche | G06F 3/038 345/174 |
| 2020/0051479 | A1 * | 2/2020 | Lee | G09G 3/20 |
| 2021/0312850 | A1 * | 10/2021 | Kim | G09G 3/3607 |
| 2022/0114985 | A1 * | 4/2022 | Howard | G09G 3/2092 |
| 2024/0038110 | A1 * | 2/2024 | Kobayashi | G09G 3/2096 |
| 2024/0412706 | A1 * | 12/2024 | Chien | G09G 3/3677 |
| 2025/0069539 | A1 * | 2/2025 | Sameer Kalathil | G09G 3/2092 |
| 2025/0218339 | A1 * | 7/2025 | Cheng | G09G 3/2096 |

* cited by examiner

DISPLAY DEVICE PERFORMING MULTI-FREQUENCY DRIVING AND ELECTRONIC DEVICE

This application claims priority to Korean Patent Application No. 10-2024-0072661, filed on Jun. 3, 2024, and all the benefits accruing therefrom under 35 U.S.C. § 119, the content of which in its entirety is herein incorporated by reference.

BACKGROUND

1. Field

Embodiments of the invention relate to a display device, and more particularly to a display device which performs multi-frequency driving ("MFD"), and an electronic device including the display device.

2. Description of the Related Art

Reduction of power consumption may be beneficial in a display device employed in a portable device, such as a smartphone, a tablet computer, etc. In a display device, a low frequency driving technique, which drives or refreshes a display panel at a frequency lower than a normal driving frequency, may be utilized to reduce the power consumption.

SUMMARY

In a display device to which the low frequency driving technique is applied, when a still image is not displayed in an entire region of a display panel, or when the still image is displayed only in a partial region of the display panel, the entire region of the display panel may be driven at the normal driving frequency. Thus, in this case, the low frequency driving may not be performed, and the power consumption may not be reduced.

Some embodiments provide a display device capable of driving panel regions at different frequencies in a mode in which input image data are not stored in a frame memory.

Some embodiments provide an electronic device capable of driving panel regions at different frequencies in a mode in which input image data are not stored in a frame memory.

According to embodiments, a display device includes a display panel, and a panel driver which drives the display panel. In such embodiments, the panel driver receives a multi-frequency driving ("MFD") enable command from a host processor. In such embodiments, in a first frame period, the panel driver receives a boundary setting command indicating a boundary between a first panel region and a second panel region of the display panel from the host processor. In such embodiments, in a second frame period after the first frame period, the panel driver receives input image data for the first panel region from the host processor, does not receive the input image data for the second panel region from the host processor, drives the first panel region based on the input image data for the first panel region, and does not drive the second panel region.

In embodiments, in the second frame period, the panel driver may provide data voltages and scan signals to the first panel region to drive the first panel region, and may not provide the data voltages and the scan signals to the second panel region not to drive the second panel region.

In embodiments, in the second frame period, the panel driver may drive the first and second panel regions at different driving frequencies in a mode in which the input image data received from the host processor are not stored in a frame memory included in the display device.

In embodiments, the first panel region may be an upper panel region located over the boundary indicated by the boundary setting command, and the second panel region may be a lower panel region located under the boundary. In such embodiments, in the second frame period, the panel driver may drive the upper panel region at a first driving frequency, and may drive the lower panel region at a second driving frequency lower than the first driving frequency.

In embodiments, the panel driver may include an MFD enable register which store a value of the MFD enable command. In such embodiments, the panel driver may generate an MFD enable signal based on the value stored in the MFD enable register.

In embodiments, in a first portion of an active period of the second frame period allocated to the first panel region, the panel driver may periodically receive a horizontal synchronization packet from the host processor. In such embodiments, in a second portion of the active period of the second frame period allocated to the second panel region, the panel driver may not receive the horizontal synchronization packet from the host processor.

In embodiments, in the second portion of the active period of the second frame period, a data lane between the host processor and the panel driver may have a low power state indicating that no data is transferred.

In embodiments, the panel driver may compare first input image data received in a previous frame period with second input image data received in a current frame period, and may transfer a tearing effect signal to the host processor when the second input image data are different from the first input image data.

In embodiments, the host processor may retransfer the second input image data to the panel driver in a next frame period in response to the tearing effect signal.

In embodiments, the host processor may compare a number of first line data included in the first input image data with a number of second line data included in the second input image data, and may determine that the second input image data are different from the first input image data when the number of the second line data is different from the number of the first line data.

In embodiments, the host processor may compare a first check value of the first input image data with a second check value of the second input image data when the number of the second line data is equal to the number of the first line data, and may determine that the second input image data are different from the first input image data when the second check value is different from the first check value.

According to embodiments, a display device includes a display panel, and a panel driver which drives the display panel. In such embodiments, the panel driver receives an MFD enable command from a host processor. In such embodiments, in a first frame period, the panel driver receives a panel region update command indicating whether each of a plurality of panel regions is updated, and at least one boundary setting command indicating at least one boundary between the plurality of panel regions from the host processor. In such embodiments, in a second frame period after the first frame period, the panel driver receives input image data for a panel region designated to be updated by the panel region update command among the plurality of panel regions from the host processor, and drives the panel region designated to be updated based on the input image data.

In embodiments, in the second frame period, the panel driver may not receive the input image data for a panel region designated not to be updated by the panel region update command among the plurality of panel regions from the host processor, and may not drive the panel region designated not to be updated.

In embodiments, a number of bits of the panel region update command may be equal to a number of the plurality of panel regions.

In embodiments, a number of bits of the panel region update command may be determined based on a number of the plurality of panel regions into which the display panel is divided.

In embodiments, the plurality of panel regions may include a first panel region, a second panel region and a third panel region. In such embodiments, the panel region update command may include a first bit indicating whether the first panel region is updated, a second bit indicating whether the second panel region is updated, and a third bit indicating whether the third panel region is updated.

In embodiments, in the second frame period, the panel driver may drive the plurality of panel regions at different driving frequencies in a mode in which the input image data received from the host processor are not stored in a frame memory included in the display device.

In embodiments, the panel driver may compare first input image data received in a previous frame period with second input image data received in a current frame period, and may transfer a tearing effect signal to the host processor when the second input image data are different from the first input image data.

In embodiments, the panel driver may compare the first input image data with the second input image data based on the panel region update command, numbers of line data included in the first and second input image data, and check values of the first and second input image data.

According to embodiments, an electronic device includes a host processor which provides input image data, and a display device which displays an image based on the input image data. In such embodiments, the host processor transfers an MFD enable command to the display device. In such embodiments, in a first frame period, the host processor transfers a boundary setting command indicating a boundary between a first panel region and a second panel region of a display panel of the display device to the display device. In such embodiments, in a second frame period after the first frame period, the host processor transfers the input image data for the first panel region to the display device and does not transfer the input image data for the second panel region to the display device, and the display device drives the first panel region based on the input image data for the first panel region and does not drive the second panel region.

As described above, in a display device and an electronic device according to embodiments, the display device may receive an MFD enable command and a boundary setting command from a host processor, and may drive only a portion of a display panel by receiving input image data only for the portion of the display panel in a subsequent frame period. Accordingly, the display device may drive panel regions at different driving frequencies in a mode (e.g., a video mode) in which the input image data are not stored in a frame memory.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
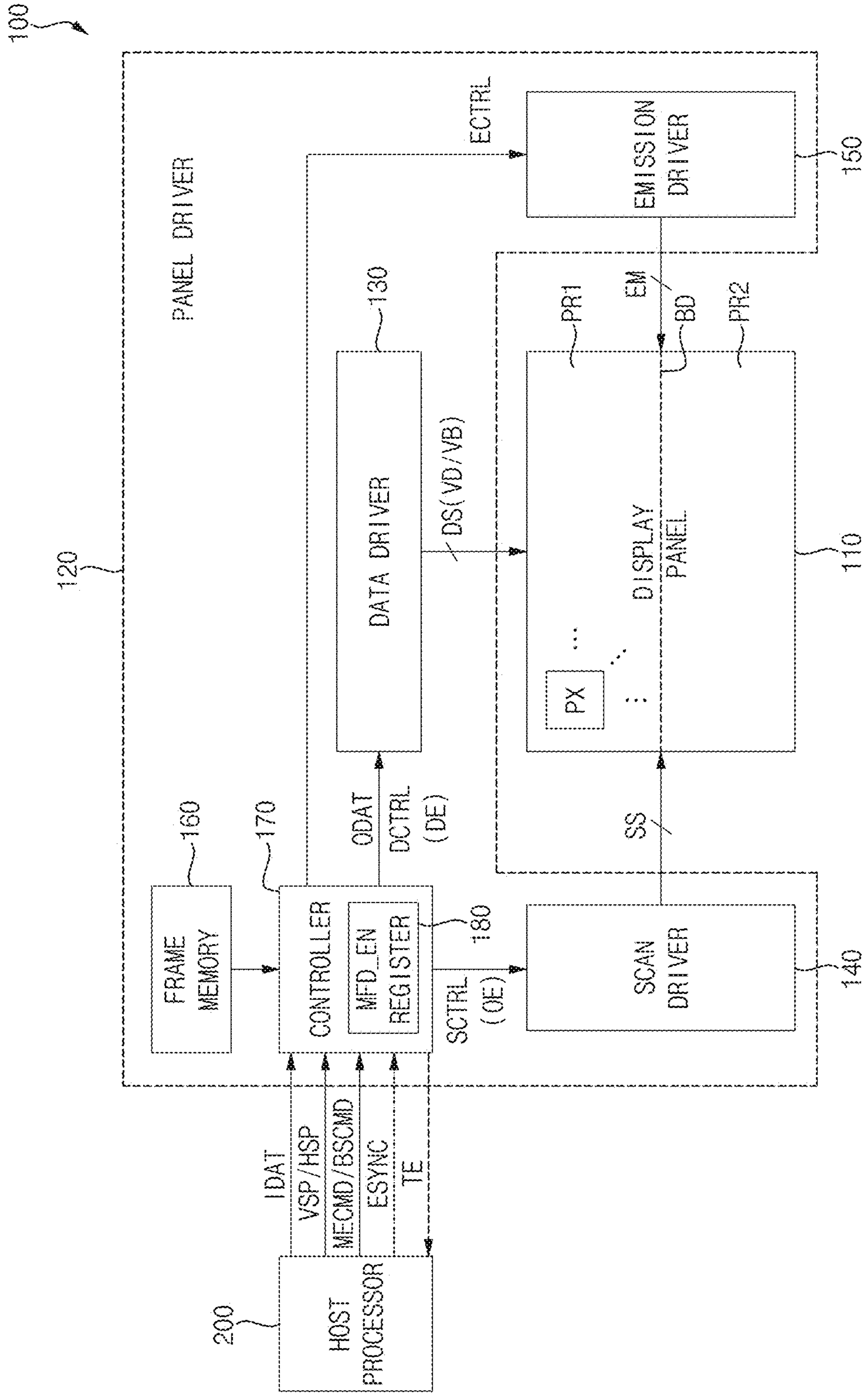
FIG. 1 is a block diagram illustrating a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms “below” or “beneath” can, therefore, encompass both an orientation of above and below.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram illustrating a display device according to embodiments.

Referring to FIG. 1, a display device 100 according to embodiments may include a display panel 110 that includes a plurality of pixels PX, and a panel driver 120 that drives the display panel 110. In some embodiments, the panel driver 120 may include a data driver 130 that provides data signals DS to the plurality of pixels PX, a scan driver 140 that provides scan signals SS to the plurality of pixels PX, an emission driver 150 that provides emission signals EM to the plurality of pixels PX, a frame memory 160, and a controller 170 that controls an operation of the display device 100.

The display panel 110 may include data lines, scan lines, emission lines, and the plurality of pixels PX connected thereto. In some embodiments, each pixel PX may include at least two transistors, at least one capacitor and a light emitting element, and the display panel 110 may be a light emitting display panel. In an embodiment, for example, the light emitting element may be an organic light emitting diode (“OLED”), a nano light emitting diode (“NED”), a quantum dot (“QD”) light emitting diode, a micro light emitting diode, an inorganic light emitting diode, or any other suitable light emitting element. In other embodiments, the display panel 110 may be a liquid crystal display (“LCD”) panel, or any other suitable display panel.

The data driver 130 may generate the data signals DS based on a data control signal DCTRL and output image data ODAT received from the controller 170, and may provide the data signals DS to the plurality of pixels PX through the data lines. The data control signal DCTRL may include a data enable signal DE indicating that output image data ODAT are transferred. In addition, in some embodiments, the data control signal DCTRL may further include, but is not limited to, a horizontal start signal and a load signal. In some embodiments, the data driver 130 may provide data voltages VD corresponding to the output image data ODAT as the data signals DS to the plurality of pixels PX in a vertical active period, and may output a blank voltage VB to the data lines in a vertical blank period (e.g., a vertical front porch period and a vertical back porch period). In some embodiments, the data driver 130 and the controller 170 may be implemented as a single integrated circuit, and the single integrated circuit may be referred to as a timing controller embedded data driver (“TED”). In other embodiments, the data driver 130 and the controller 170 may be implemented as separate integrated circuits.

The scan driver 140 may generate the scan signals SS based on a scan control signal SCTRL received from the controller 170, and may sequentially provide the scan signals SS to the plurality of pixels PX on a row-by-row basis through the scan lines. The scan control signal SCTRL may include, but is not limited to, a scan start signal, a scan clock signal, etc. In some embodiments, the scan control signal SCTRL may further include an output enable signal OE for controlling outputting of the scan signals SS. In an embodiment, for example, the scan driver 140 may output the scan signals SS in response to the output enable signal OE having a high level, and may not output the scan signals SS in response to the output enable signal OE having a low level. In other embodiments, the outputting of the scan signals SS may be controlled by the scan clock signal. Further, in some embodiments, the scan driver 140 may be integrated or formed in the display panel 110. In other embodiments, the scan driver 140 may be implemented with one or more integrated circuits.

The emission driver 150 may generate the emission signals EM based on an emission control signal ECTRL received from the controller 170, and may sequentially provide the emission signals EM to the plurality of pixels PX on a row-by-row basis through the emission lines. In some embodiments, the emission control signal ECTRL may include, but is not limited to, an emission start signal, an emission clock signal, etc. In some embodiments, the emission driver 150 may be integrated or formed in the display panel 110. In other embodiments, the emission driver 150 may be implemented with one or more integrated circuits.

The controller 170 (e.g., a timing controller (“TCON”) may receive input image data IDAT, a vertical synchronization packet VSP and a horizontal synchronization packet HSP from an outside, e.g., an external host processor 200 (e.g., an application processor ("AP"), a graphics processing unit ("GPU") or a graphics card). The controller 170 may generate the output image data ODAT provided to the data driver 130 based on the input image data IDAT. Further, in some embodiments, the controller 170 may generate an internal vertical synchronization signal in response to the vertical synchronization packet VSP, and may generate an internal horizontal synchronization signal in response to the horizontal synchronization packet HSP. As will be described below, the controller 170 of the display device 100 according to embodiments may further receive a multi-frequency driving ("MFD") enable command MECMD and a boundary setting command BSCMD from the host processor 200. In some embodiments, the input image data IDAT, the vertical synchronization packet VSP, the horizontal synchronization packet HSP, the enable command MECMD and the boundary setting command BSCMD may be transferred through a same data lane between the host processor 200 and the controller 170, but is not limited thereto. Further, in some embodiments, the controller 170 may periodically receive an external synchronization signal ESYNC from the host processor 200 at every horizontal time, but is not limited thereto. In addition, in some embodiments, the controller 170 may provide a tearing effect signal TE to the host processor 200. The controller 170 may control the data driver 130 by providing the data control signal DCTRL and the output image data ODAT to the data driver 130, may control the scan driver 140 by providing the scan control signal SCTRL to the scan driver 140, and may control the emission driver 150 by providing the emission control signal ECTRL to the emission driver 150.

In the display device 100 according to embodiments, in a first mode (e.g., a command mode), the panel driver 120 may store the input image data IDAT received from the host processor 200 in the frame memory 160, and may drive the display panel 110 to display an image based on the input image data IDAT stored in the frame memory 160. Further, in a second mode (e.g., a video mode), the panel driver 120 may drive the display panel 110 to display an image based on the input image data IDAT received from the host processor 200 without storing the input image data IDAT received from the host processor 200 in the frame memory 160. A conventional display device typically operates in the first mode (e.g., the command mode) to perform an MFD operation that drives panel regions at different driving frequencies. That is, in the second mode (e.g., the video mode) in which the input image data are not stored in the frame memory, the conventional display device may not perform the MFD operation.

In the display device 100 according to embodiments, not only in the first mode (e.g., the command mode), but also in the second mode (e.g., the video mode) in which the input image data IDAT received from the host processor 200 are not stored in the frame memory 160, the panel driver 120 may receive the MFD enable command MECMD and the boundary setting command BSCMD from the host processor 200, and may drive first and second panel regions PR1 and PR2 of the display panel 110 at different driving frequencies based on the MFD enable command MECMD and the boundary setting command BSCMD.

In the second mode (e.g., the video mode), the panel driver 120 may receive the MFD enable command MECMD indicating whether the MFD operation is to be performed from the host processor 200. In an embodiment, for example, the MFD enable command MECMD having a first value may indicate that the MFD operation starts, and the MFD enable command MECMD having a second value may indicate that MFD operation ends. In some embodiments, the controller 170 of the panel driver 120 may include an MFD enable register 180 that stores a value of the MFD enable command MECMD. The controller 170 may generate an MFD enable signal based on the value stored in the MFD enable register 180.

In such embodiments, in a first frame period after the MFD enable command MECMD having the first value is received, the panel driver 120 may receive the boundary setting command BSCMD indicating a boundary BD between the first panel region PR1 and the second panel region PR2 of the display panel 110 from the host processor 200. The panel driver 120 may divide the display panel 110 into the first and second panel regions PR1 and PR2 with the boundary BD therebetween based on the boundary setting command BSCMD.

In a second frame period after the first frame period, the panel driver 120 may receive the input image data IDAT for the first panel region PR1 from the host processor 200 and may not receive the input image data IDAT for the second panel region PR2 from the host processor 200. Further, the panel driver 120 may drive the first panel region PR1 based on the input image data IDAT for the first panel region PR1, and may not drive the second panel region PR2. That is, in the second frame period, to drive the first panel region PR1, the data driver 130 of the panel driver 120 may provide the data voltages VD to the first panel region PR1, and the scan driver 140 of the panel driver 120 may provide the scan signals SS to the first panel region PR1. However, in the second frame period, not to drive the second panel region PR2, the data driver 130 of the panel driver 120 may not provide the data voltages VD to the second panel region PR2, and the scan driver 140 of the panel driver 120 may not provide the scan signals SS to the second panel region PR2.

Accordingly, the display device 100 according to embodiments may drive the first and second panel regions PR1 and PR2 at different driving frequencies in a mode in which the input image data IDAT received from the host processor 200 are not stored in the frame memory 160. In some embodiments, the first panel region PR1 may be an upper panel region located over the boundary BD indicated by the boundary setting command BSCMD, and the second panel region PR2 may be a lower panel region located under the boundary BD. The panel driver 120 may drive the first panel region PR1, or the upper panel region at a first driving frequency, and may drive the second panel region PR2, or the lower panel region at a second driving frequency lower than the first driving frequency.

Figure 2:
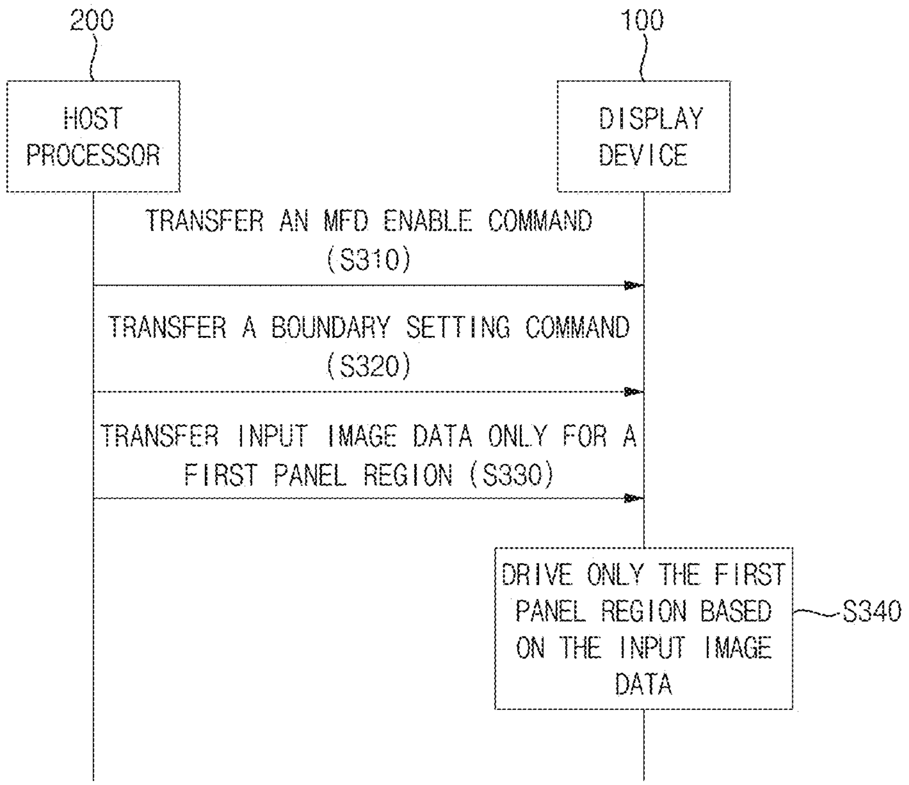
FIG. 2 is a flowchart illustrating a method of operating a display device according to embodiments.
Figure 3:
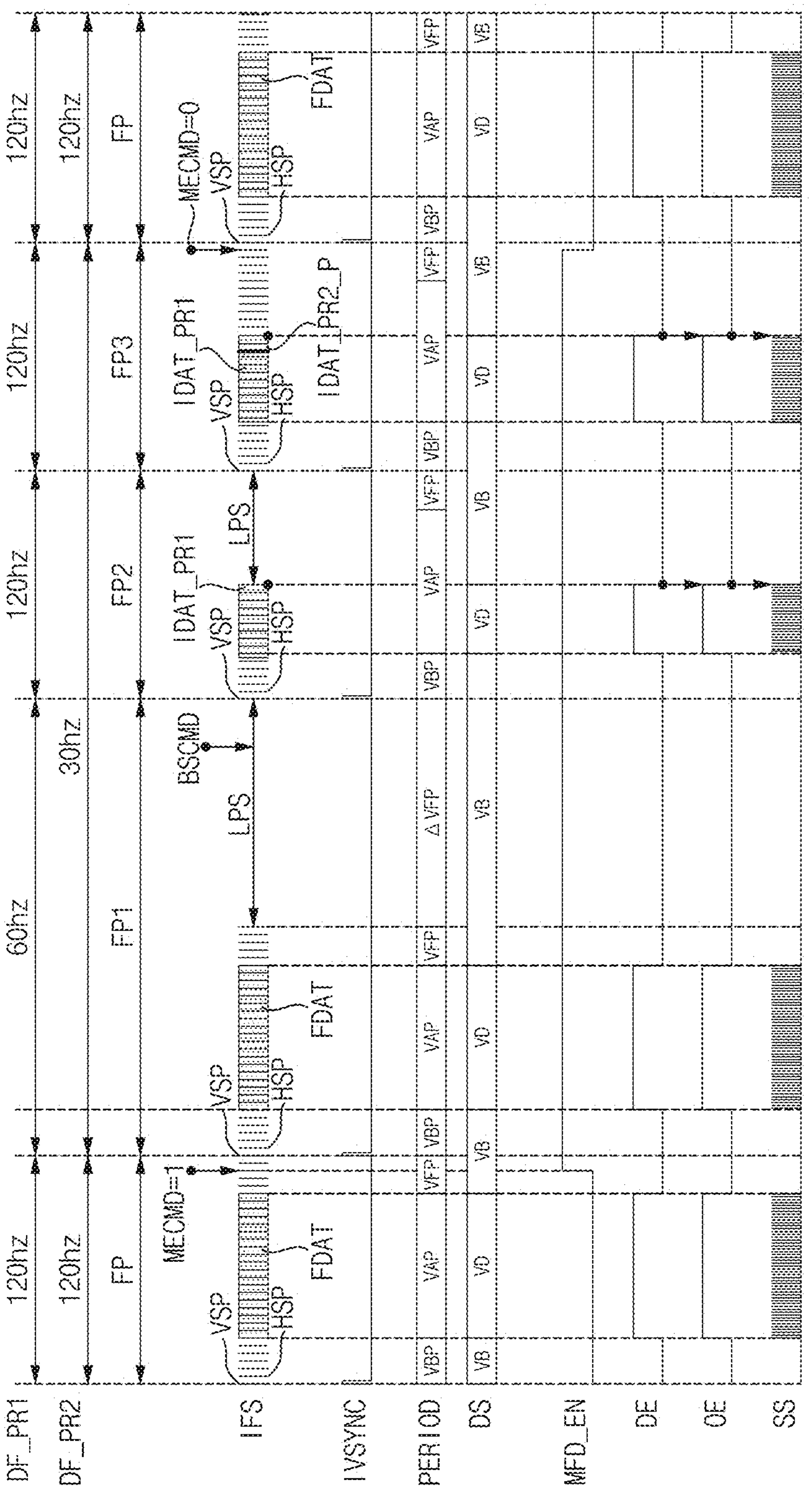
FIG. 3 is a timing diagram for describing an example of an operation of a display device according to embodiments.

FIG. 2 is a flowchart illustrating a method of operating a display device according to embodiments, and FIG. 3 is a timing diagram for describing an example of an operation of a display device according to embodiments.

Referring to FIGS. 1 and 2, in embodiments, a host processor 200 may transfer an MFD enable command MECMD to a display device 100, and the display device 100 may receive the MFD enable command MECMD from the host processor 200 (S310).

In an embodiment, for example, as illustrated in FIG. 3, each frame period FP can include a vertical active period VAP in which data voltages VD are provided to a display panel 110, a vertical back porch period VBP before the vertical active period VAP, and a vertical front porch period VFP after the vertical active period VAP. Further, at a start time point of each frame period FP, a panel driver 120 may receive a vertical synchronization packet VSP as an interface signal IFS between the host processor 200 and the display device 100, and may generate an internal vertical synchronization signal IVSYNC in response to the vertical synchronization packet VSP. Further, the panel driver 120 may receive a horizontal synchronization packet HSP as an interface signal IFS at every horizontal time.

In the vertical active period VAP of the frame period FP before an MFD operation starts, the panel driver 120 may receive input image data IDAT, or frame data FDAT for the entire region of the display panel 110 from the host processor 200, and may provide the data voltages VD and scan signals SS to the entire region of the display panel 110 based on the frame data FDAT to drive the entire region of the display panel 110. In the vertical front porch period VFP after the vertical active period VAP, the panel driver 120 may receive the MFD enable command MECMD having a first value (e.g., a value of "1") indicating that the MFD operation starts from the host processor 200, and may store the first value of the MFD enable command MECMD in a MFD enable register 180. In subsequent frame periods FP1, FP2 and FP3, the panel driver 120 may generate an MFD enable signal MFD_EN having a high level based on the first value stored in the MFD enable register 180, and may perform the MFD operation.

In a frame period after the MFD enable command MECMD having the first value is transferred, the host processor 200 may transfer a boundary setting command BSCMD indicating a boundary BD between a first panel region PR1 and a second panel region PR2 to the display device 100, and the display device 100 may receive the boundary setting command BSCMD from the host processor 200 (S320).

In an embodiment, for example, as illustrated in FIG. 3, in a vertical active period VAP of a first frame period FP1 after the MFD enable command MECMD having the first value is received, the panel driver 120 may receive the frame data FDAT, and may drive the entire region of the display panel 110 based on the frame data FDAT. In an embodiment, for example, the controller 170 may provide the frame data FDAT as output image data ODAT to the data driver 130, may provide a data enable signal DE having a high level in the entire vertical active period VAP, and the data driver 130 may provide the data voltages VD to the entire region of the display panel 110. Further, the controller 170 may provide an output enable signal OE having a high level in the entire vertical active period VAP to the scan driver 140, and the scan driver 140 may provide the scan signals SS to the entire region of the display panel 110.

In some embodiments, a vertical front porch period VFP of the first frame period FP1 may be extended by a delta front porch period ΔVFP corresponding to an arbitrary time. When the vertical front porch period VFP is extended by the delta front porch period ΔVFP, a driving frequency of the display panel 110 may be reduced. Further, in some embodiments, in the delta front porch period ΔVFP, as illustrated in FIG. 3, a data lane between the host processor 200 and the display device 100 may be in a low power state LPS indicating that no data is transferred. In an embodiment, for example, the data lane includes a positive data line and a negative data line, and both the positive data line and the negative data line may be fixed to a high voltage level in the low power state LPS, but is not limited thereto.

Further, in the vertical front porch period VFP or the delta front porch period ΔVFP of the first frame period FP1, the panel driver 120 may receive the boundary setting command BSCMD indicating the boundary BD between the first panel region PR1 and the second panel region PR2 from the host processor 200.

In a frame period after the boundary setting command BSCMD is transferred, the host processor 200 may transfer input image data IDAT only for the first panel region PR1 to the display device 100, and may not transfer input image data IDAT for the second panel region PR2 to the display device 100. The display device 100 may receive the input image data IDAT only for the first panel region PR1 from the host processor 200, and may not receive the input image data IDAT for the second panel region PR2 from the host processor 200 (S330). Further, in the frame period, the display device 100 may drive only the first panel region PR1 based on the input image data IDAT (S340). That is, the display device 100 may drive the first panel region PR1 based on the input image data IDAT for the first panel region PR1, and may not drive the second panel region PR2.

In an embodiment, for example, as illustrated in FIG. 3, in a vertical active period VAP of a second frame period FP2 after the first frame period FP1 in which the boundary setting command BSCMD is transferred, the panel driver 120 may receive the input image data IDAT_PR1 only for the first panel region PR1 from the host processor 200, and may drive only the first panel region PR1 based on the input image data IDAT_PR1. In an embodiment, for example, the controller 170 may provide the input image data IDAT_PR1 for the first panel region PR1 as the output image data ODAT to the data driver 130, and may provide the data enable signal DE having the high level in a first portion of the vertical active period VAP allocated to the first panel region PR1. The data driver 130 may provide the data voltages VD to the first panel region PR1 based on the output image data ODAT. Further, the controller 170 may provide the output enable signal OE having the high level in the first portion of the vertical active period VAP allocated to the first panel region PR1 to the scan driver 140, and the scan driver 140 may provide the scan signals SS to the first panel region PR1. In addition, in the first portion of the vertical active period VAP allocated to the first panel region PR1, the panel driver 120 may periodically receive the horizontal synchronization packet HSP from the host processor 200 at every horizontal time.

However, in the vertical active period VAP of the second frame period FP2, the panel driver 120 may not receive the input image data for the second panel region PR2 from the host processor 200, and may not drive the second panel region PR2. In an embodiment, for example, the controller 170 may provide the data enable signal DE having a low level in a second portion of the vertical active period VAP allocated to the second panel region PR2, and the data driver 130 may not provide the data voltages VD to the second panel region PR2. Further, the controller 170 may provide the scan driver 140 with the output enable signal OE having a low level in the second portion of the vertical active period VAP allocated to the second panel region PR2, and the scan driver 140 may not provide the scan signals SS to the second panel region PR2. In addition, in the second portion of the vertical active period VAP allocated to the second panel region PR2, the panel driver 120 may not receive the horizontal synchronization packet HSP from the host processor 200. In some embodiments, in the second portion of the vertical active period VAP allocated to the second panel region PR2 and in a vertical front porch period VFP after the vertical active period VAP, the data lane between the host processor 200 and the panel driver 120 of the display device 100 may be in the low power state LPS indicating that no data is transferred.

Further, in a third frame period FP3 after the second frame period FP2, similarly to the second frame period FP2, the panel driver 120 may receive the input image data IDAT_PR1 only for the first panel region PR1 from the host processor 200, and may drive only the first panel region PR1. Accordingly, the second panel region PR2 may be driven at a driving frequency DF_PR2 lower than a driving frequency DF_PR1 of the first panel region PR1. In an embodiment, for example, the first panel region PR1 may be driven at a driving frequency DF_PR1 of about 60 hertz (Hz) in the first frame period FP1, and may be driven at a driving frequency DF_PR1 of about 120 Hz in each of the second and third frame periods FP2 and FP3. However, the second panel region PR2 may be driven at a driving frequency DF_PR2 of about 30 Hz in the first, second and third frame periods FP1, FP2 and FP3.

In some embodiments, as illustrated in FIG. 3, in the third frame period FP3, when the panel driver 120 further receives a portion IDAT_PR2_P of the input image data for the second panel region PR2 from the host processor 200, the panel driver 120 may further drive a portion of the second panel region PR2, but is not limited thereto.

Further, in a vertical front porch period VFP of the third frame period FP3, the panel driver 120 may receive the MFD enable command MECMD having a second value (e.g., a value of "0") indicating that the MFD operation ends from the host processor 200, and may store the second value of the MFD enable command MECMD in the MFD enable register 180. In the subsequent frame period FP, the panel driver 120 may generate the MFD enable signal MFD_EN having a low level based on the second value stored in the MFD enable register 180, and may drive the entire region of the display panel 110.

As described above, the display device 100 according to embodiments may receive the MFD enable command MECMD and the boundary setting command BSCMD from the host processor 200, and may drive only a portion of the display panel 110 based on the MFD enable command MECMD and the boundary setting command BSCMD. Accordingly, the display device 100 may drive the first and second panel regions PR1 and PR2 at different driving frequencies DF_PR1 and DF_PR2 in a mode (e.g., video mode) in which the input image data IDAT are not stored in a frame memory 160.

Figure 4:
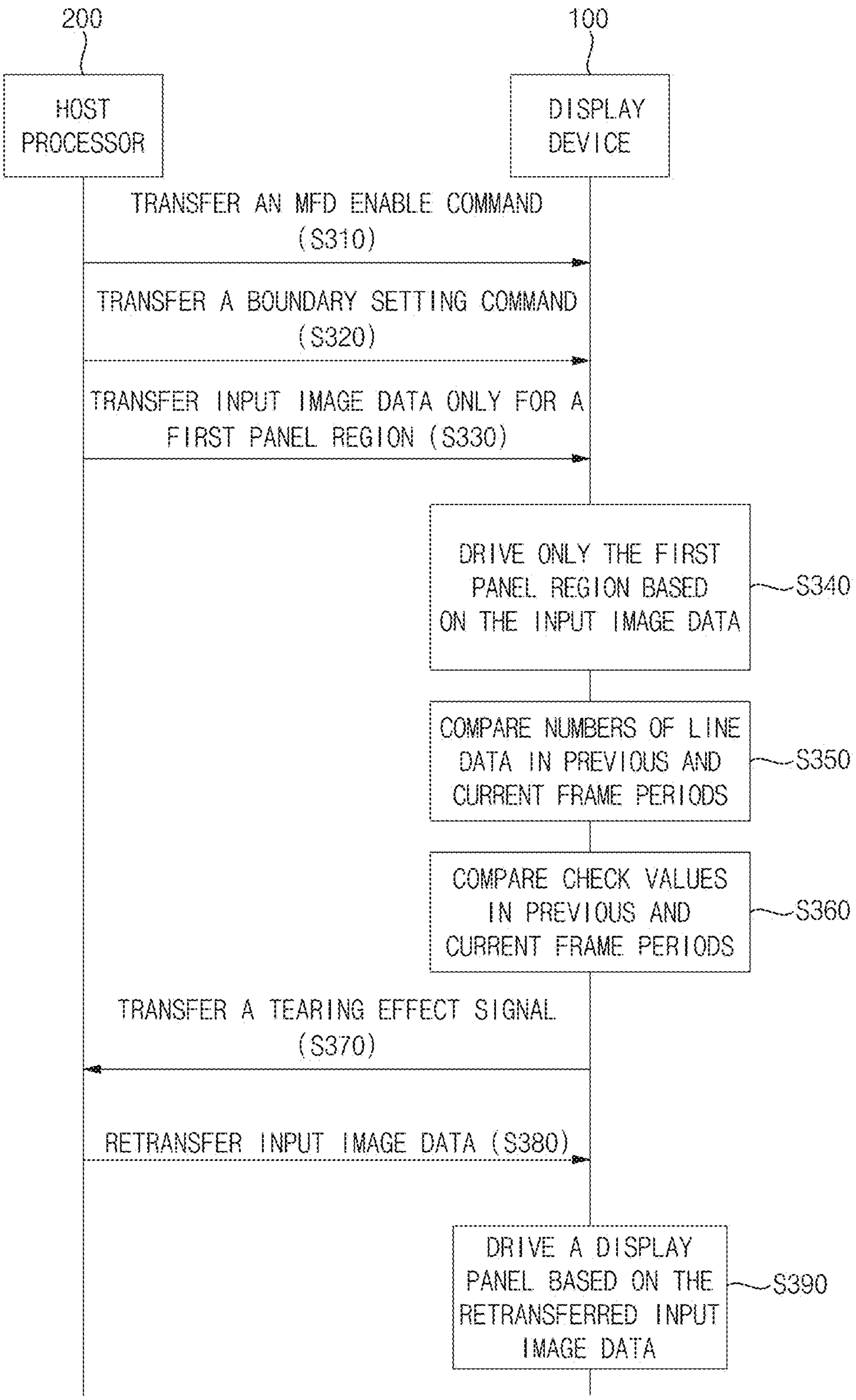
FIG. 4 is a flowchart illustrating a method of operating a display device according to embodiments.
Figure 5:
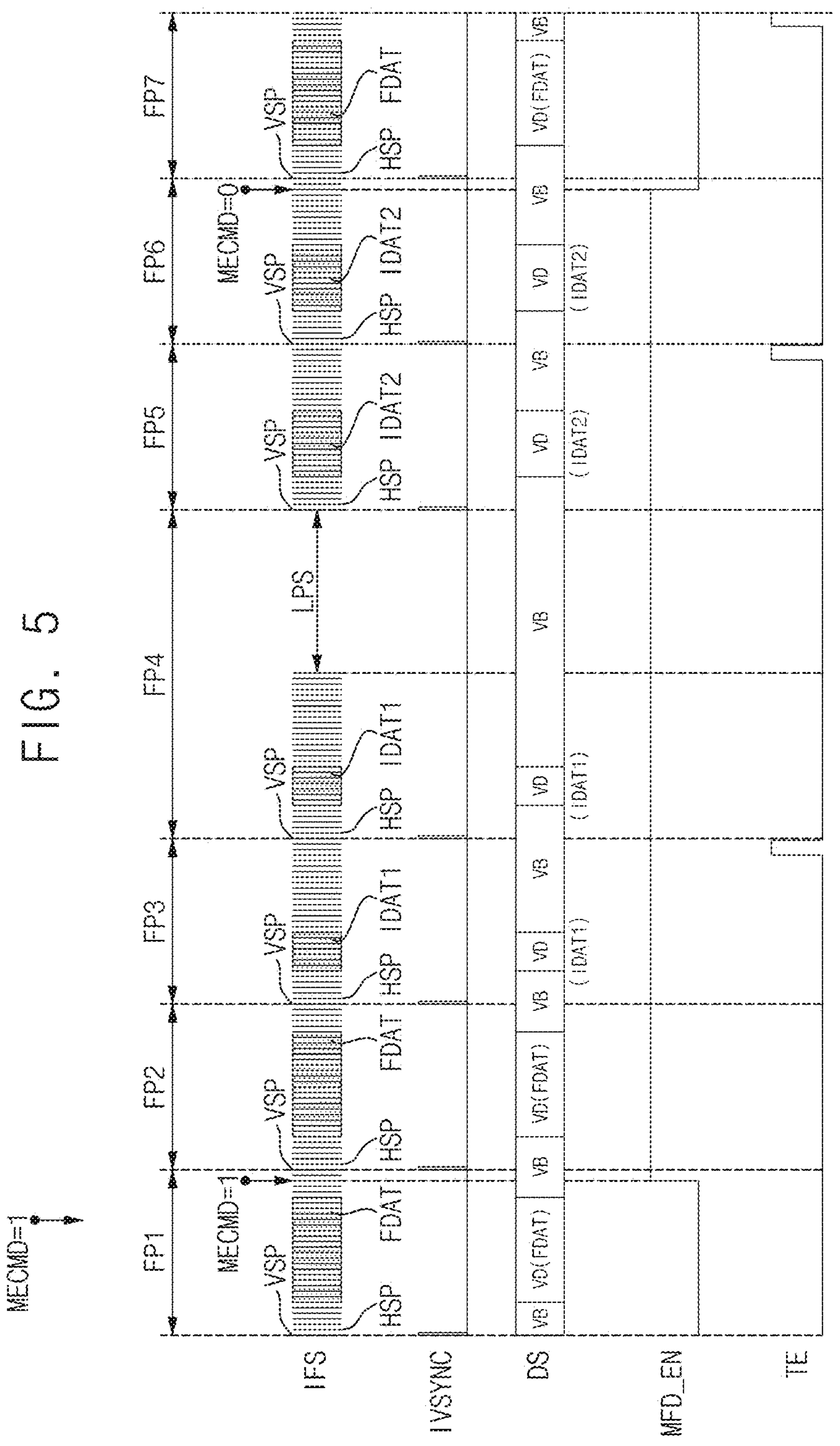
FIG. 5 is a timing diagram for describing an example of an operation of a display device according to embodiments.

FIG. 4 is a flowchart illustrating a method of operating a display device according to embodiments, and FIG. 5 is a timing diagram for describing an example of an operation of a display device according to embodiments.

A method of FIG. 4 may be similar to a method of FIG. 2, except that a display device 100 may provide a host processor 200 with a tearing effect signal for refreshing a display panel.

Referring to FIGS. 1 and 4, in embodiments, the host processor 200 may transfer an MFD enable command MECMD and a boundary setting command BSCMD to the display device 100 (S310 and S320), and may transfer input image data IDAT only for the first panel region PR1 in a subsequent frame period (S330). In this case, the display device 100 may drive only the first panel region PR1 in the subsequent frame period (S340).

Further, a panel driver 120 of the display device 100 may compare first input image data received in a previous frame period with second input image data received in a current frame period (S350 and S360). When the second input image data are different from the first input image data, the panel driver 120 may transfer a tearing effect signal TE to the host processor 200 (S370). In some embodiments, the panel driver 120 may compare the number of first line data included in the first input image data with the number of second line data included in the second input image data to compare the first input image data and the second input image data (S350). In such embodiments, when the number of the second line data is different from the number of the first line data, the panel driver 120 may determine that the second input image data are different from the first input image data. Further, in some embodiments, when the number of the second line data is equal to the number of the first line data, the panel driver 120 may further compare a first check value of the first input image data with a second check value of the second input image data (S360). In an embodiment, for example, each of the first and second check values may be a cyclic redundancy check ("CRC") value or a checksum value, but is not limited thereto. In such an embodiment, when the second check value is different from the first check value, the panel driver 120 may determine that the second input image data are different from the first input image data. In a next frame period, the host processor 200 may retransfer the second input image data to the panel driver 120 in response to the tearing effect signal TE (S380), and the panel driver 120 may drive a display panel 110 based on the retransferred second input image data (S390).

In an embodiment, for example, as illustrated in FIG. 5, when an MFD enable command MECMD having a first value (e.g., a value of "1") is received in a first frame period FP1, the panel driver 120 may perform an MFD operation in subsequent frame periods FP2, FP3, FP4, FP5 and FP6. When frame data FDAT are received as the input image data IDAT in a second frame period FP2, the panel driver 120 may drive the entire region of the display panel 110 by providing data voltages VD corresponding to the frame data FDAT to the display panel 110. Further, the panel driver 120 may compare the frame data FDAT received in the first frame period FP1 with the frame data FDAT received in the second frame period FP2. In some embodiments, the panel driver 120 may compare the numbers of line data and check values of the frame data FDAT in the first and second frame periods FP1 and FP2. When the numbers of line data and the check values are the same as each other, the panel driver 120 may not transfer the tearing effect signal TE to the host processor 200. When first input image data IDAT1 are received in a third frame period FP3, the panel driver 120 may drive a portion of the display panel 110 by providing the data voltages VD corresponding to the first input image data IDAT1 to the display panel 110. Further, the panel driver 120 may compare the frame data FDAT received in the second frame period FP2 with the first input image data IDAT1 received in the third frame period FP3. In an embodiment, for example, the numbers of line data and check values in the second and third frame periods FP1 and FP2 may be compared. When the number of line data included in the first input image data IDAT1 received in the third frame period FP3 is less than the number of line data included in the frame data FDAT received in the second frame period FP2, the panel driver 120 may transfer a tearing effect signal TE to the host processor 200.

In response to the tearing effect signal TE, in a fourth frame period FP4, the host processor 200 may retransfer the first input image data IDAT1 of the third frame period FP3 to the display device 100. The panel driver 120 may drive the portion of the display panel 110 again based on the first input image data IDAT1. In this case, a step efficiency phenomenon, in which the display panel 110 does not have a desired luminance when luminances change between frame periods, may be substantially reduced or effectively prevented. Further, when the numbers of line data and the check values are the same in the third and fourth frame periods FP3 and FP4, the panel driver 120 may not transfer the tearing effect signal TE to the host processor 200.

Further, when second input image data IDAT2 are received in a fifth frame period FP5, the panel driver 120 may drive a portion of the display panel 110 by providing data voltages VD corresponding to the second input image data IDAT2 to the display panel 110. Further, the panel driver 120 may compare the first input image data IDAT1 received in the fourth frame period FP4 with the second input image data IDAT2 received in the fifth frame period FP5. In an embodiment, for example, the number of line data and check values in the fourth and fifth frame periods FP4 and FP5 may be compared. When the numbers of line data in the fourth and fifth frame periods FP4 and FP5 are different from each other, or when the check values in the fourth and fifth frame periods FP4 and FP5 are different from each other, the panel driver 120 may transfer the tearing effect signal TE to the host processor 200.

In response to the tearing effect signal TE, in a sixth frame period FP6, the host processor 200 may retransfer the second input image data IDAT2 of the fifth frame period FP5 to the display device 100. The panel driver 120 may drive the portion of the display panel 110 again based on the second input image data IDAT2. In this case, the step efficiency phenomenon may be substantially reduced or effectively prevented. Further, when the numbers of line data and check values in the fifth and sixth frame periods FP5 and FP6 are the same, the panel driver 120 may not transfer the tearing effect signal TE to the host processor 200. Further, when the panel driver 120 receives the MFD enable command MECMD having a second value (e.g., a value of "0") from the host processor 200 in the sixth frame period FP6, the panel driver 120 may drive the entire region of the display panel 110 in a subsequent seventh frame period FP7.

Figure 6:
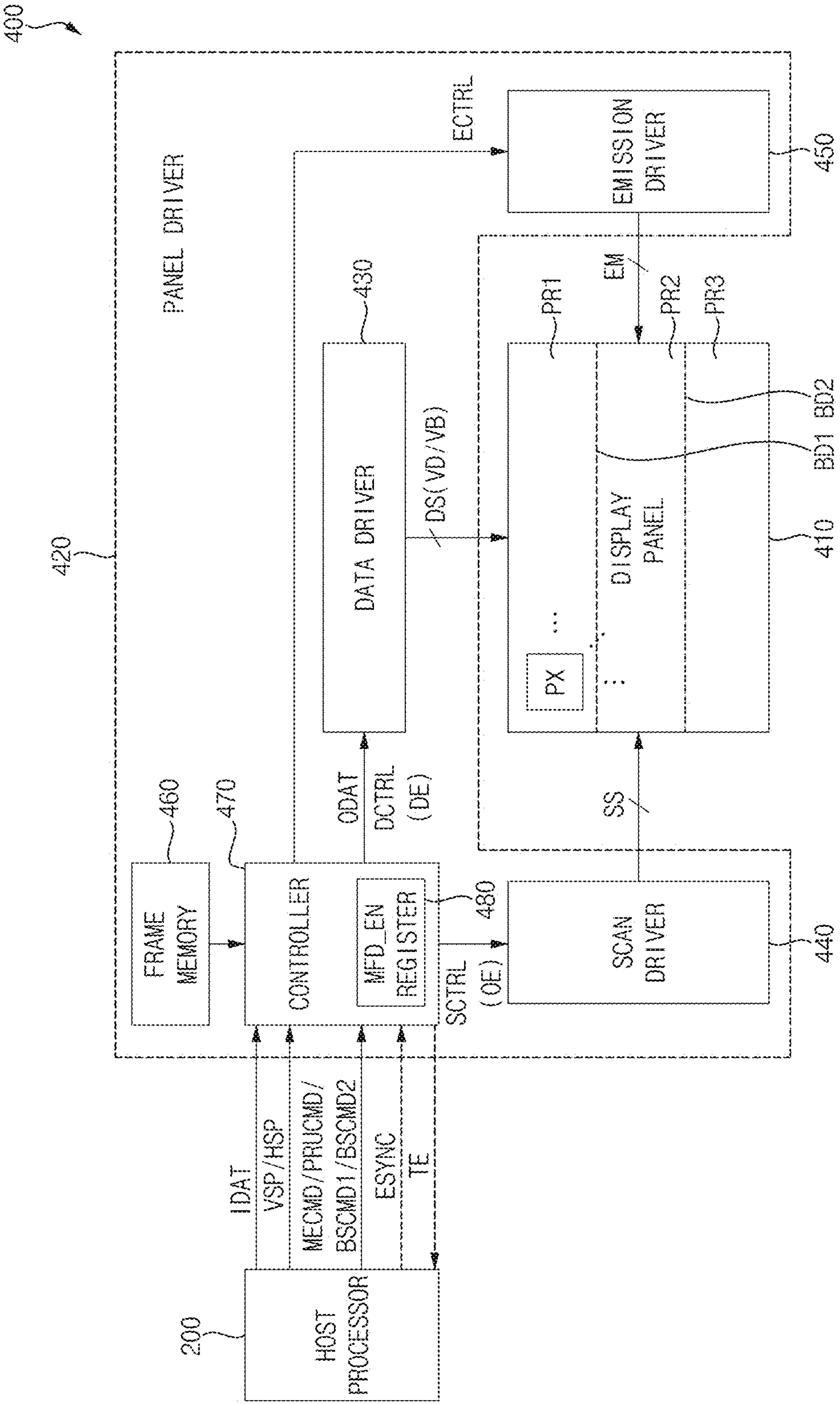
FIG. 6 is a block diagram illustrating a display device according to embodiments.

FIG. 6 is a block diagram illustrating a display device according to embodiments.

Referring to FIG. 6, a display device 400 according to embodiments may include a display panel 410, and a panel driver 420 that drives the display panel 410. In some embodiments, the panel driver 420 may include a data driver 430, a scan driver 440, an emission driver 450, a frame memory 460 and a controller 470. The display device 400 of FIG. 6 may have a similar configuration and a similar operation to a display device 100 of FIG. 1, except that the display panel 410 is divided into three or more panel regions PR1, PR2 and PR3.

In the display device 400 according to embodiments, the panel driver 420 may receive an MFD enable command MECMD from the host processor 200, and perform an MFD operation in response to the MFD enable command MECMD. Further, in a first frame period, the panel driver 420 may receive a panel region update command PRUCMD indicating whether each of the plurality of panel regions PR1, PR2 and PR3 is updated, and at least one boundary setting command BSCMD1 and BSCMD2 indicating at least one boundary BD1 and BD2 between the plurality of panel regions PR1, PR2 and PR3 from the host processor 200. In some embodiments, the number of bits of the panel region update command PRUCMD may be substantially equal to the number of the plurality of panel regions PR1, PR2 and PR3. Further, each bit of the panel region update command PRUCMD may indicate whether a corresponding panel region is updated. In an embodiment, for example, when the display panel 410 is divided into a first panel region PR1, a second panel region PR2 and a third panel region PR3, the panel region update command PRUCMD may have a first bit indicating whether the first panel region PR1 is updated, a second bit indicating whether the second panel region PR2 is updated, and a third bit indicating whether the third panel region PR3 is updated. Further, in some embodiments, the number of bits of the panel region update command PRUCMD may be determined based on the number of panel regions PR1, PR2 and PR3 into which the display panel 410 is divided.

In a second frame period after the first frame period, the panel driver 420 may receive input image data IDAT for a panel region designated to be (or indicated as being) updated by the panel region update command PRUCMD from among the plurality of panel regions PR1, PR2 and PR3 from the host processor 200, and may drive only the panel region designated to be updated based on the input image data IDAT. That is, in the second frame period, the panel driver 420 may not receive the input image data IDAT for a panel region designated not to be updated by the panel region update command PRUCMD from the host processor 200, and may not drive the panel region designated not to be updated.

Accordingly, the display device 400 according to embodiments may drive the plurality of panel regions PR1, PR2 and PR3 at different driving frequencies not only in a first mode (e.g., a command mode) in which the input image data IDAT received from the host processor 200 are stored in the frame memory 460, but also in a second mode (e.g., a video mode) in which the input image data IDAT received from the host processor 200 are not stored in the frame memory 460.

Figure 7:
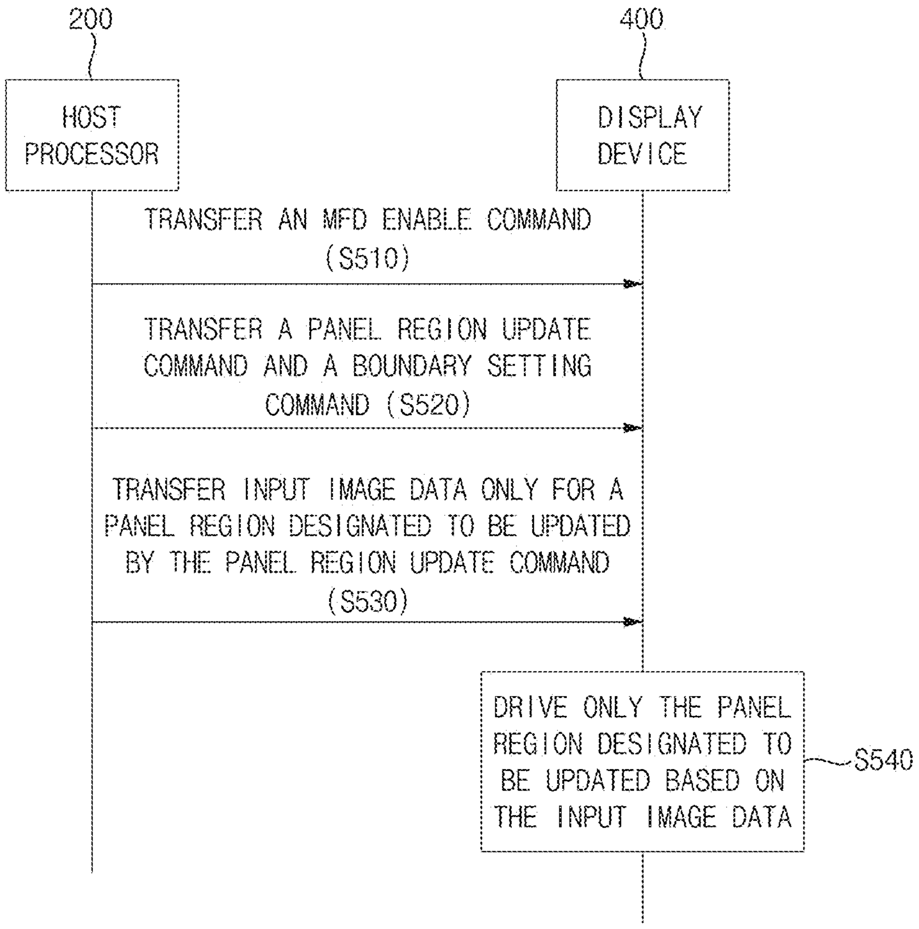
FIG. 7 is a flowchart illustrating a method of operating a display device according to embodiments.
Figure 8:
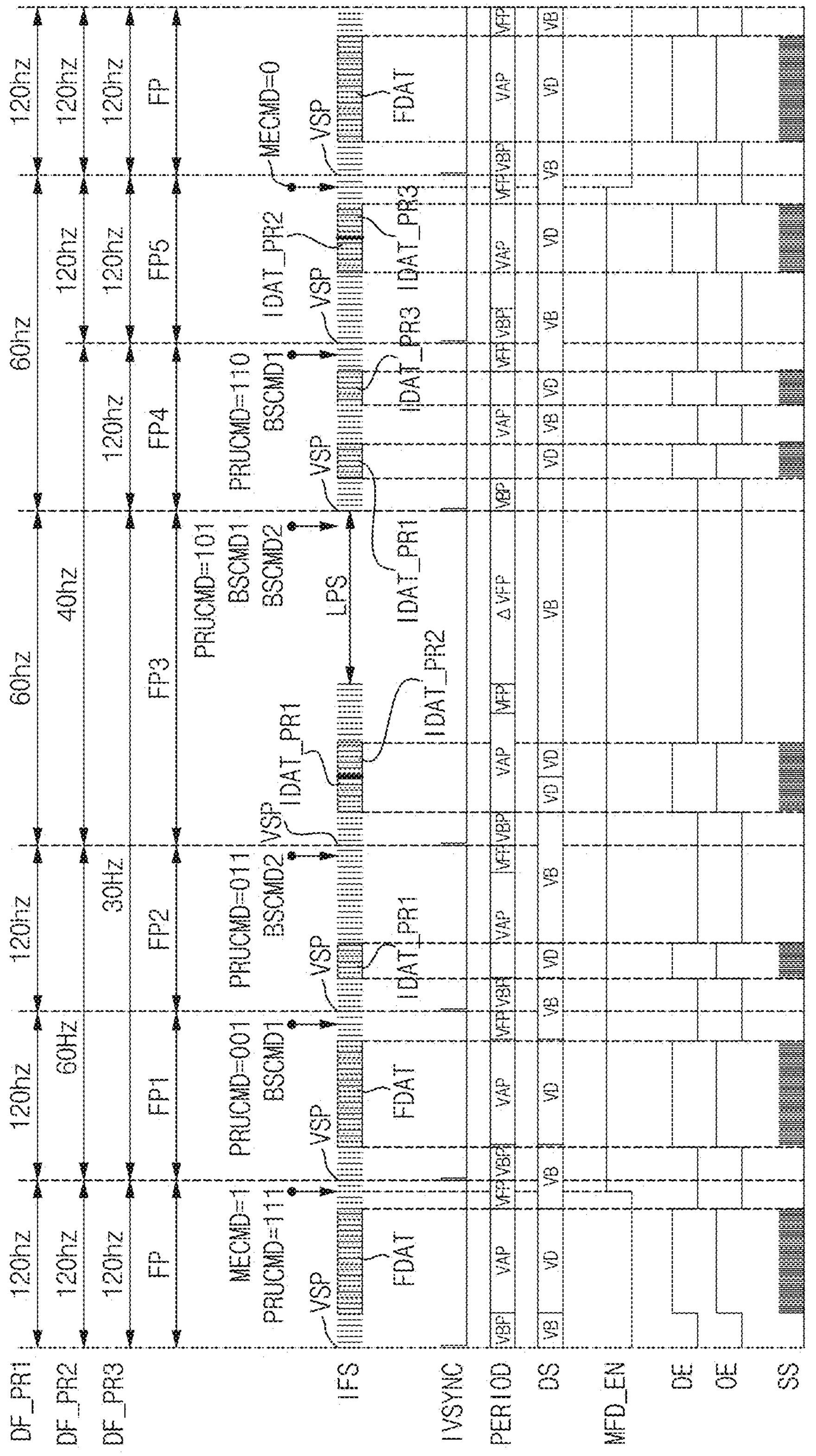
FIG. 8 is a timing diagram for describing an example of an operation of a display device according to embodiments.

FIG. 7 is a flowchart illustrating a method of operating a display device according to embodiments, and FIG. 8 is a timing diagram for describing an example of an operation of a display device according to embodiments.

Referring to FIGS. 6, 7 and 8, in embodiments, a host processor 200 may transfer an MFD enable command MECMD to a display device 400, and the display device 400 may receive the MFD enable command MECMD from the host processor 200 (S510). In an embodiment, for example, in a vertical front porch period VFP of a frame period FP before an MFD operation starts, a panel driver 420 may receive the MFD enable command MECMD having a first value (e.g., a value of "1") indicating that the MFD operation starts from the host processor 200, and may store the first value of the MFD enable command MECMD in an MFD enable register 480. In subsequent frame periods FP1, FP2, FP3, FP4 and FP5, the panel driver 420 may generate an MFD enable signal MFD_EN having a high level based on the first value stored in the MFD enable register 480, and may perform the MFD operation. Further, in some embodiments, the panel driver 420 may receive a panel region update command PRUCMD having a value of "111" from the host processor 200 indicating that all of first, second and third panel regions PR1, PR2 and PR3 are updated, but is not limited thereto.

Further, in a first frame period FP1 after the MFD enable command MECMD having the first value is transferred, the panel driver 420 may receive frame data FDAT for the entire region of a display panel 410 from the host processor 200, and may drive the entire region of the display panel 410. Further, in the first frame period FP1, the panel driver 420 may receive a panel region update command PRUCMD having a value of "001" from the host processor 200 indicating that the first panel region PR1 is updated and the second and third panel regions PR2 and PR3 are not updated (S520). In this case, the panel driver 420 may further receive a first boundary setting command BSCMD1 indicating a first boundary BD1 between the first panel region PR1 designated to be updated and the second panel region PR2 designated not to be updated from the host processor 200 (S520).

In a second frame period FP2 after the first frame period FP1, the panel driver 420 may receive input image data IDAT_PR1 only for the first panel region PR1 designated to be updated by the panel region update command PRUCMD from the host processor 200 (S530), may drive only the first panel region PR1 based on the input image data IDAT_PR1 (S540), and may not drive the second and third panel regions PR2 and PR3. Further, in the second frame period FP2, the panel driver 420 may receive a panel region update command PRUCMD having a value of "011" indicating that the first and second panel regions PR1 and PR2 are updated and the third panel region PR3 is not updated from the host processor 200 (S520). In this case, the panel driver 420 may further receive a second boundary setting command BSCMD2 indicating a second boundary BD2 between the second panel region PR2 designated to be updated from the host processor 200 and the third panel region PR3 designated not to be updated (S520).

In a third frame period FP3 after the second frame period FP2, the panel driver 420 may receive input image data IDAT_PR1 and IDAT_PR2 only for the first and second panel regions PR1 and PR2 designated to be updated by the panel region update command PRUCMD from the host processor 200 (S530), may drive only the first and second panel regions PR1 and PR2 based on the input image data IDAT_PR1 and IDAT_PR2 (S540), and may not drive the third panel region PR3. In some embodiments, a vertical front porch period VFP of the third frame period FP3 may be extended by a delta front porch period ΔVFP corresponding to an arbitrary time. Further, in some embodiments, in the delta front porch period ΔVFP, a data lane between the host processor 200 and the display device 400 may be in a low power state LPS indicating that no data is transferred. Further, in the third frame period FP3, the panel driver 420 may receive a panel region update command PRUCMD having a value of "101" indicating that the first and third panel regions PR1 and PR3 are updated and the second panel region PR2 is not updated from the host processor 200 (S520). In this case, the panel driver 420 may further receive the first boundary setting command BSCMD1 indicating the first boundary BD1 between the first panel region PR1 and the second panel region PR2 from the host processor 200, and the second boundary setting command BSCMD2 indicating the second boundary BD2 between the second panel region PR2 and the third panel region PR3 (S520).

In a fourth frame period FP4 after the third frame period FP3, the panel driver 420 may receive input image data IDAT_PR1 and IDAT_PR3 only for the first and third panel regions PR1 and PR3 designated to be updated by the panel region update command PRUCMD from the host processor 200 (S530), may drive only the first and third panel regions PR1 and PR3 based on the input image data IDAT_PR1 and IDAT_PR3 (S540), and may not drive the second panel region PR2. Further, in the fourth frame period FP4, the panel driver 420 may receive a panel region update command PRUCMD having a value of "110" indicating that the second and third panel regions PR2 and PR3 are updated and the first panel region PR1 is not updated from the host processor 200 (S520). In this case, the panel driver 420 may further receive the first boundary setting command BSCMD1 indicating the first boundary BD1 between the first panel region PR1 and the second panel region PR2 from the host processor 200 (S520).

In a fifth frame period FP5 after the fourth frame period FP4, the panel driver 420 may receive input image data IDAT_PR2 and IDAT_PR3 only for the second and third panel regions PR2 and PR3 designated to be updated by the panel region update command PRUCMD from the host processor 200 (S530), may drive only the second and third panel regions PR2 and PR3 based on the input image data IDAT_PR2 and IDAT_PR3 (S540), and may not drive the first panel region PR1.

Accordingly, the first, second and third panel regions PR1, PR2 and PR3 may be driven at different driving frequencies DF_PR1, DF_PR2 and DF_DR3. In an embodiment, for example, the first panel region PR1 may be driven at a driving frequency DF_PR1 of about 120 Hz in each of the first and second frame periods FP1 and FP2, and may be driven with a driving frequency DF_PR1 of about 60 Hz in each of the third, fourth and fifth frame periods FP3, FP4 and FP5. However, the second panel region PR2 may be driven at a driving frequency DF_PR2 of about 60 Hz in the first and second frame periods FP1 and FP2, may be driven at a driving frequency DF_PR2 of about 40 Hz in the third and fourth frame periods FP3 and FP4, and may be driven at a driving frequency DF_PR2 of about 120 Hz in the fifth frame period FP5. Further, the third panel region PR3 may be driven at a driving frequency DF_PR3 of about 30 Hz in the first, second and third frame periods FP1, FP2 and FP3, and may be driven at a driving frequency DF_PR3 of about 120 Hz in each of the fourth and fifth frame periods FP4 and FP5.

Further, in the fifth frame period FP5, the panel driver 420 may receive an MFD enable command MECMD having a second value (e.g., a value of "0") indicating that the MFD operation ends from the host processor 200, may store the second value of the MFD enable command MECMD in the MFD enable register 480. In a subsequent frame period FP, the panel driver 420 may generate an MFD enable signal MFD_EN having a low level based on the second value stored in the MFD enable register 480, and may drive the entire region of the display panel 410.

As described above, the display device 400 according to embodiments may receive the MFD enable command MECMD, the panel region update command PRUCMD and at least one boundary setting command BSCMD1 and BSCMD2 from the host processor 200, and may drive three or more panel regions PR1, PR2 and PR3 at different driving frequencies DF_PR1, DF_PR2 and DF_PR3 based on the MFD enable command MECMD, the panel region update command PRUCMD and at least one boundary setting command BSCMD1 and BSCMD2.

Figure 9:
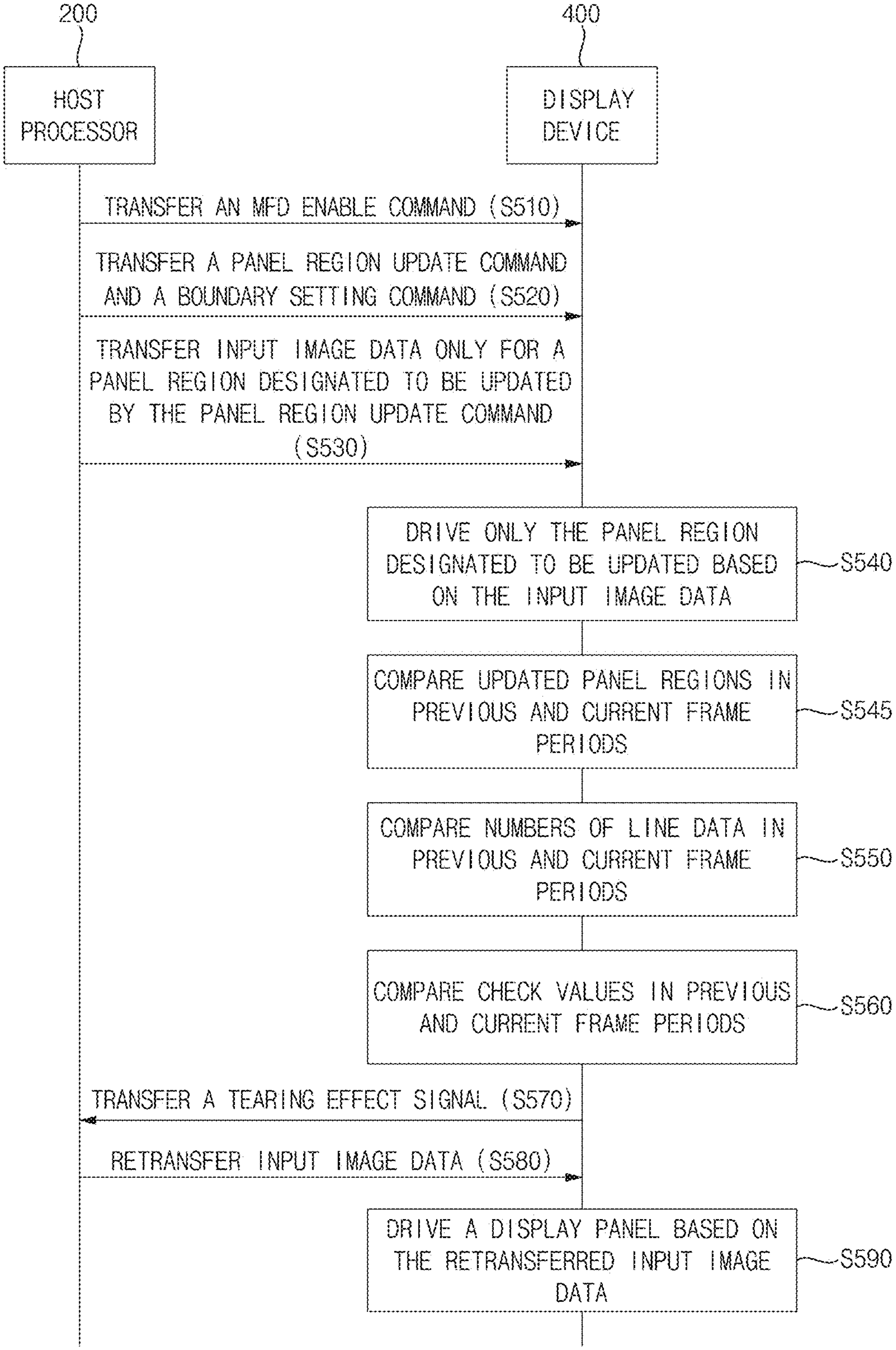
FIG. 9 is a flowchart illustrating a method of operating a display device according to embodiments.
Figure 10:
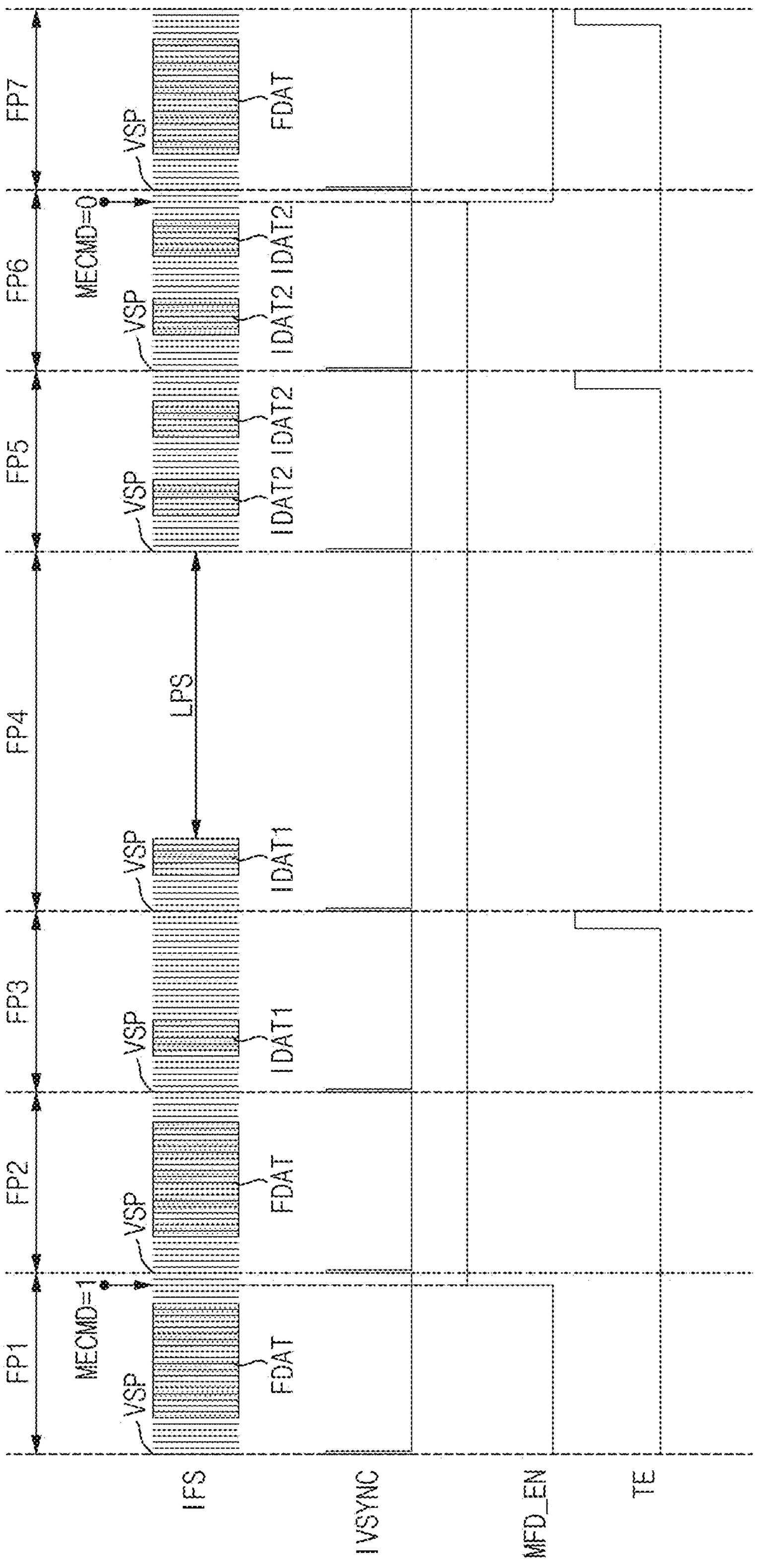
FIG. 10 is a timing diagram for describing an example of an operation of a display device according to embodiments.

FIG. 9 is a flowchart illustrating a method of operating a display device according to embodiments, and FIG. 10 is a timing diagram for describing an example of an operation of a display device according to embodiments.

A method of FIG. 9 may be similar to a method of FIG. 7, except that a display device 400 may provide a host processor 200 with a tearing effect signal for refreshing a display panel.

Referring to FIG. 6 and FIG. 9, in embodiments, the host processor 200 may transfer an MFD enable command MECMD, a panel region update command PRUCMD and at least one boundary setting command BSCMD1 and BSCMD2 to the display device 400 (S510 and S520), and may transfer input image data IDAT only for a panel region designated to be updated by the panel region update command PRUCMD (S530). In this case, the display device 400 may drive only the panel region designated to be updated by the panel region update command PRUCMD based on the input image data IDAT (S540).

Further, a panel driver 420 of the display device 400 may compare first input image data received in a previous frame period with second input image data received in a current frame period (S545, S550 and S560), and may transfer the tearing effect signal TE to the host processor 200 when the second input image data are different from the first input image data (S570). In some embodiments, in order to compare the first input image data with the second input image data, the panel driver 420 may compare updated panel regions (or the panel region update commands PRUCMD) in the previous and current frame periods (S545), may compare the numbers of line data included in the first and second input image data in the previous and current frame periods (S550), and may compare check values (e.g., CRC values or checksum values) of the first and second input image data in the previous and current frame periods (S560). In a next frame period, the host processor 200 may retransfer the second input image data to the panel driver 420 in response to the tearing effect signal TE (S580), and the panel driver 420 may drive a display panel 410 based on the retransferred second input image data (S590).

In an embodiment, for example, as illustrated in FIG. 10, when an MFD enable command MECMD having a first value (e.g., a value of "1") is received in a first frame period FP1, the panel driver 420 may perform an MFD operation in subsequent frame periods FP2, FP3, FP4, FP5 and FP6. In a case where frame data FDAT for the first, second and third panel regions PR1, PR2 and PR3 are received as input image data IDAT in a second frame period FP2, and first input image data IDAT1 only for the first panel region PR1 are received in a third frame period FP3, all of the first, second and third panel regions PR1, PR2 and PR3 may be updated in the second frame period FP2, but only the first panel region PR1 may be driven or updated in the third frame period FP3. Thus, the panel driver 420 may transfer the tearing effect signal TE to the host processor 200. In response to the tearing effect signal TE, in a fourth frame period FP4, the host processor 200 may retransfer the first input image data IDAT1 of the third frame period FP3 to the display device 400. The panel driver 420 may drive the first panel region PR1 again based on the first input image data IDAT1. In this case, a step efficiency phenomenon in which the display panel 410 does not have a desired luminance when luminances change between frame periods may be substantially reduced or effectively prevented. Further, in the third and fourth frame periods FP3 and FP4, when the updated panel region (i.e., the first panel region PR1) is the same as each other, the numbers of line data are the same as each other, and the check values are the same as each other, the panel driver 420 may not transfer the tearing effect signal TE. Further, in a case where the first input image data IDAT1 for the first panel region PR1 are received in the fourth frame period FP4 and the second input image data IDAT2 for the first and third panel regions PR1 and PR3 are received in the fifth frame period FP5, the panel driver 420 may transfer the tearing effect signal TE to the host processor 200. In response to the tearing effect signal TE, the host processor 200 may retransfer the second input image data IDAT2 of the fifth frame period FP5 to the display device 400 in a sixth frame period FP6. The panel driver 420 may drive the first and third panel regions PR1 and PR3 again based on the second input image data IDAT2. Further, in the sixth frame period FP6, when the panel driver 420 receives an MFD enable command MECMD having a second value (e.g., a value of "0") from the host processor 200, the panel driver 420 may drive the entire region of the display panel 410 in a subsequent seventh frame period FP7.

Figure 11:
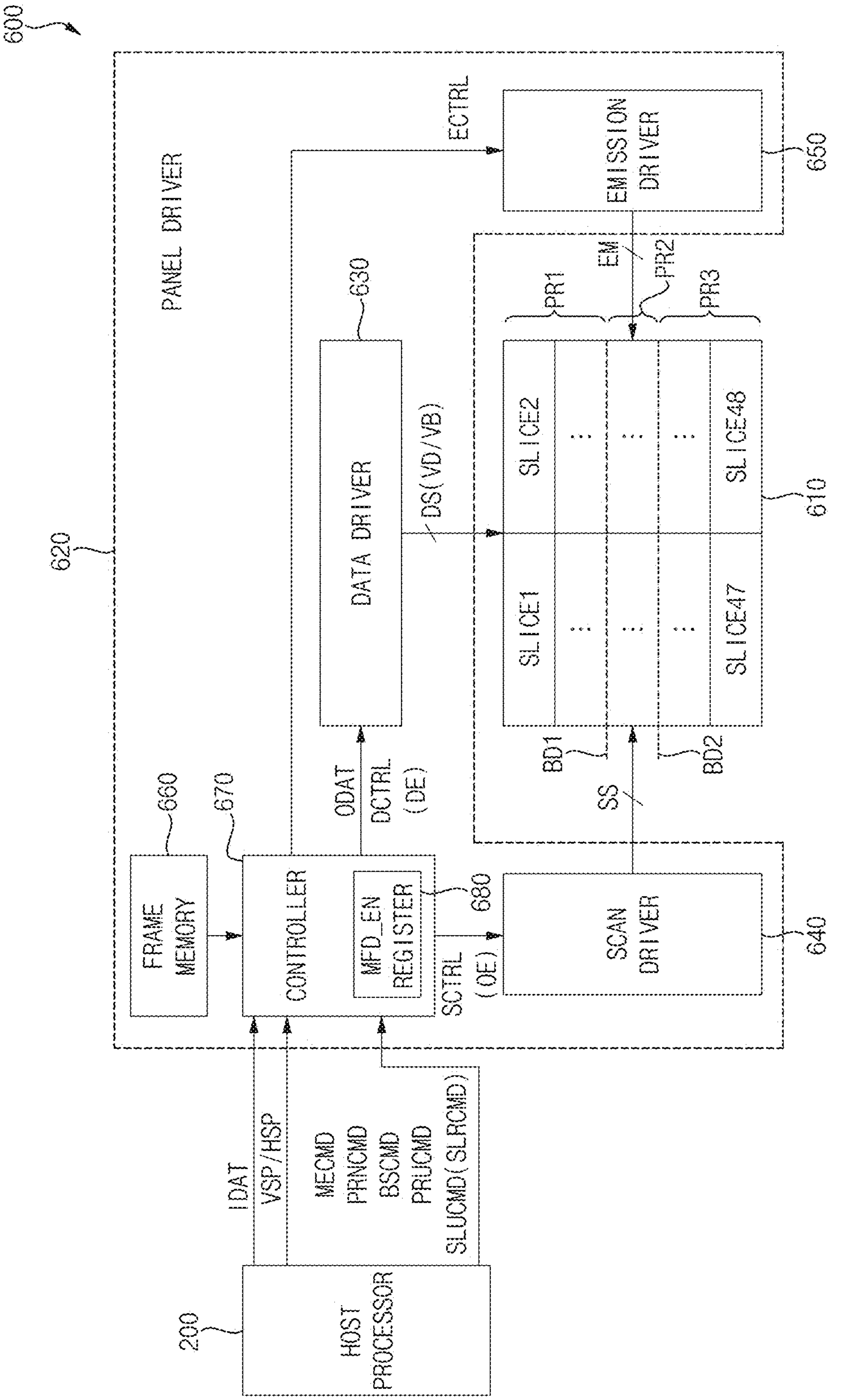
FIG. 11 is a block diagram illustrating a display device according to embodiments.
Figure 12:
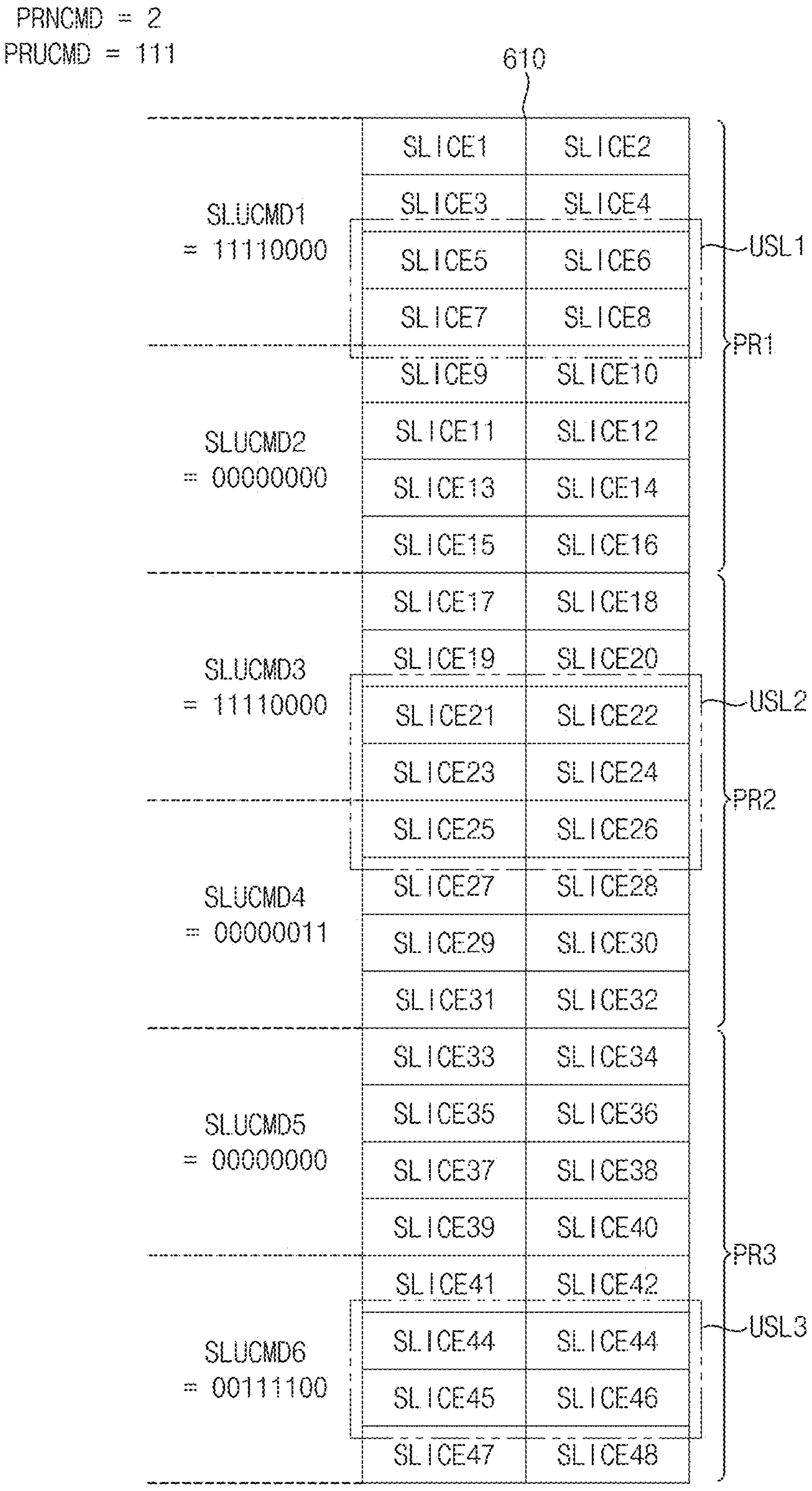
FIG. 12 is a diagram for describing an example of a plurality of slices into which a display panel is divided, and a plurality of slice update commands indicating whether the plurality of slices are updated.
Figure 13:
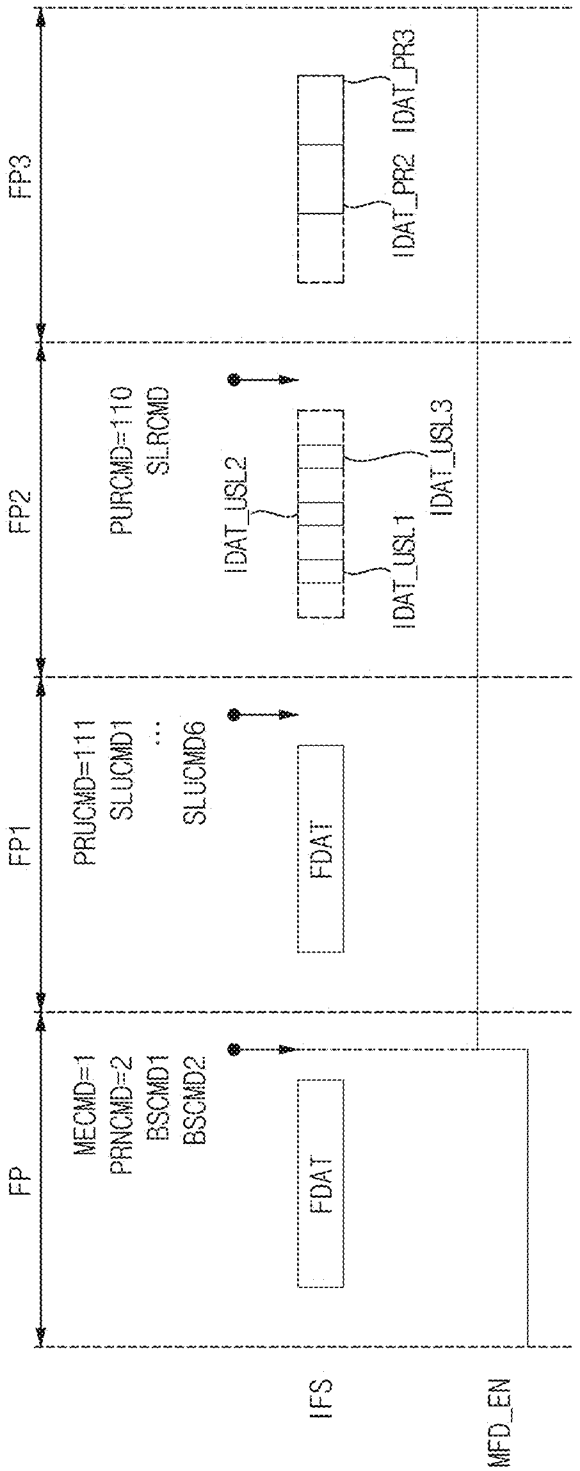
FIG. 13 is a timing diagram for describing an example of an operation of a display device according to embodiments.

FIG. 11 is a block diagram illustrating a display device according to embodiments, FIG. 12 is a diagram for describing an example of a plurality of slices into which a display panel is divided, and a plurality of slice update commands indicating whether the plurality of slices are updated, and FIG. 13 is a timing diagram for describing an example of an operation of a display device according to embodiments.

Referring to FIGS. 11, 12 and 13, a display device 600 according to embodiments may include a display panel 610, and a panel driver 620 that drives the display panel 610. In some embodiments, the panel driver 620 may include a data driver 630, a scan driver 640, an emission driver 650, a frame memory 660 and a controller 670. The display device 600 of FIG. 11 may have a similar configuration and a similar operation to a display device 100 of FIG. 1 or a display device 400 of FIG. 6, except that the display panel 610 may be divided into a plurality of slices SLICE1, SLICE2, . . . , SLICE47 and SLICE48, and each of the plurality of slices SLICE1, SLICE2, . . . , SLICE47 and SLICE48 may be selectively driven (or updated) in each frame period.

In the display device 600 according to embodiments, the panel driver 620 may receive an MFD enable command MECMD from the host processor 200, and perform an MFD operation in response to the MFD enable command MECMD. In an embodiment, for example, as illustrated in FIG. 13, in a frame period FP before the MFD operation starts, the panel driver 620 may receive an MFD enable command MECMD having a value of "1" indicating that the MFD operation starts from the host processor 200, may store the value of the MFD enable command MECMD in the MFD enable register 680. In subsequent frame periods FP1, FP2 and FP, the panel driver 620 may generate an MFD enable signal MFD_EN having a high level based on the value stored in the MFD enable register 680, and may perform the MFD operation.

Further, the panel driver 620 may receive a panel region number command PRNCMD indicating the number of a plurality of panel regions PR1, PR2 and PR3 into which the display panel 610 is divided from the host processor 200. In an embodiment, for example, a panel region number command PRNCMD having a value of 0 may indicate that the display panel 610 is not divided, a panel region number command PRNCMD having a value of 1 may indicate that the display panel 610 is divided into two panel regions, and a panel region number command PRNCMD having a value of 2 may indicate that the display panel 610 is divided into three panel regions PR1, PR2 and PR3, but is not limited thereto. Further, in examples of FIGS. 11 and 12, when the panel driver 620 receives the panel region number command PRNCMD having the value of 2 from the host processor 200, the display panel 610 may be divided into a first panel region PR1, a second panel region PR2 and a third panel region PR3.

In addition, the panel driver 620 may receive at least one boundary setting command BSCMD indicating at least one boundary BD1 and BD2 between a plurality of panel regions PR1, PR2 and PR3 from the host processor 200. In an embodiment, as shown in FIGS. 11 and 12, the panel driver 620 may receive a first boundary setting command BSCMD1 indicating a first boundary BD1 between the first panel region PR1 and the second panel region PR2, and a second boundary setting command BSCMD2 indicating a second boundary BD2 between the second panel region PR2 and the third panel region PR3 from the host processor 200.

Further, in an embodiment, as shown in FIGS. 11 and 12, the display panel 610 may be divided into first to forty-eighth slices SLICE1 to SLICE48, the first panel region PR1 may be set to include the first to sixteenth slices SLICE1 to SLICE16 by the first boundary setting command BSCMD1, the second panel region PR2 may be set to include the seventeenth to thirty-second slices SLICE17 to SLICE32 by the first and second boundary setting commands BSCMD1 and BSCMD2, and the third panel region PR3 may be set to include the thirty-third to forty-eighth slices SLICE33 to SLICE48 by the second boundary setting command BSCMD2, but is not limited thereto.

In a first frame period FP1, the panel driver 620 may receive a panel region update command PRUCMD indicating whether each of the plurality of panel regions PR1, PR2 and PR3 is updated from the host processor 200. In some embodiments, the number of bits of the panel region update command PRUCMD may be substantially equal to the number of the plurality of panel regions PR1, PR2 and PR3, and each bit of the panel region update command PRUCMD may indicate whether a corresponding panel region is updated. In an embodiment, for example, in the first frame period FP1, the panel region update command PRUCMD may have a first bit (e.g., a least significant bit) having a value of “1” indicating that the first panel region PR1 is updated, a second bit having a value of “1” indicating that the second panel region PR2 is updated, and a third bit (e.g., a most significant bit) having a value of “1” indicating that the third panel region PR3 is updated. Further, in some embodiments, the number of bits of the panel region update command PRUCMD may be determined based on the number of the plurality of panel regions PR1, PR2 and PR3 into which the display panel 610 is divided.

Further, in the first frame period FP1, the panel driver 620 may receive a plurality of slice update commands SLUCMD indicating whether each of the plurality of slices SLICE1, SLICE2, . . . , SLICE47 and SLICE48 included in each of the plurality of panel regions PR1, PR2 and PR3 is updated from the host processor 200. In an embodiment, for example, each slice update command SLUCMD may have eight bits that indicate whether eight slices are updated, respectively, but is not limited thereto. In an embodiment, as shown in FIG. 12, a first slice update command SLUCMD1 having a value of “11110000” may indicate that the first, second, third and fourth slices SLICE1, SLICE2, SLICE3 and SLICE4 are not updated and the fifth, sixth, seventh and eighth slices SLICE5, SLICE6, SLICE7 and SLICE8 are updated. Further, a second slice update command SLUCMD2 having a value of “00000000” may indicate that the ninth, tenth, eleventh, twelfth, thirteenth, fourteenth, fifteenth and sixteenth slices SLICE9, SLICE10, SLICE11, SLICE12, SLICE13, SLICE14, SLICE15 and SLICE16 are not updated. Further, a third slice update command SLUCMD3 having a value of “11110000” may indicate that the seventeenth, eighteenth, nineteenth and twentieth slices SLICE17, SLICE18, SLICE19 and SLICE20 are not updated and the twenty-first, twenty-second, twenty-third and twenty-fourth slices SLICE21, SLICE22, SLICE23 and SLICE24 are updated. Further, a fourth slice update command SLUCMD4 having a value of “00000011” may indicate that the twenty-fifth and twenty-sixth slices SLICE25 and SLICE26 are updated and the twenty-seventh, twenty-eighth, twenty-ninth, thirtieth, thirty-first and thirty-second slices SLICE27, SLICE28, SLICE29, SLICE30, SLICE31 and SLICE32 are not updated. Further, a fifth slice update command SLUCMD5 having a value of “00000000” may indicate that the thirty-third, thirty-fourth, thirty-fifth, thirty-sixth, thirty-seventh, thirty-eighth, thirty-ninth and fortieth slices SLICE33, SLICE34, SLICE35, SLICE36, SLICE37, SLICE38, SLICE39 and SLICE40 are not updated. Further, a sixth slice update command SLUCMD6 having a value of “00111100” may indicate that the forty-first, forty-second, forty-seventh and forty-eighth slices SLICE41, SLICE42, SLICE47 and SLICE48 are not updated and the forty-third, forty-fourth, forty-fifth and forty-sixth slices SLICE43, SLICE44, SLICE45 and SLICE46 are updated. That is, in an embodiment, as shown in FIG. 12, the first to sixth slice update commands SLUCMD1 to SLUCMD6 may indicate that a first slice region USL1 including the fifth to eighth slices SLICE5 to SLICE8, a second slice region USL2 including the twenty-first to twenty-sixth slices SLICE21 to SLICE26, and a third slice region USL3 including the forty-third to forty-sixth slices SLICE43 to SLICE46 are updated. In some embodiments, the panel region update command PRUCMD may have a higher priority than the slice update command SLUCMD. In an embodiment, for example, when the panel region update command PRUCMD indicates that the panel region is not updated, the slice update command SLUCMD for slices within the panel region may be ignored, and the slices within the panel region may not be updated.

In a second frame period FP2 after the first frame period FP1, the panel driver 620 may receive input image data IDAT_USL1, IDAT_USL2 and IDAT_USL3 for at least one slice SLICE5 to SLICE8, SLICE21 to SLICE26 and SLICE43 to SLICE46 designated to be updated by the panel region update command PRUCMD and the plurality of slice update commands SLUCMD1 to SLUCMD6 among the plurality of slices SLICE1 to SLICE48 from the host processor 200, and may drive the at least one slice SLICE5 to SLICE8, SLICE21 to SLICE26 and SLICE43 to SLICE46 based on the input image data IDAT_USL1, IDAT_USL2 and IDAT_USL3. In an embodiment, for example, in a case where the first to sixth slice update commands SLUCMD1 to SLUCMD6 illustrated in FIG. 12 are received in the first frame period FP1, in the second frame period FP2, the panel driver 620 may receive the input image data IDAT_USL1 for the first slice region USL1 including the fifth to eighth slices SLICE5 to SLICE8, the input image data IDAT_USL2 for the second slice region USL2 including the twenty-first to twenty-sixth slices SLICE21 to SLICE26 and the input image data IDAT_USL3 for the third slice region USL3 including the forty-third to forty-sixth slices SLICE43 to SLICE46. Further, in the second frame period FP2, the panel driver 620 may drive the fifth to eighth slices SLICE5 to SLICE8 based on the input image data IDAT_USL1 for the first slice region USL1, may drive the twenty-first to twenty-sixth slices SLICE21 to SLICE26 based on the input image data IDAT_USL2 for the second slice region USL2, may drive the forty-third to forty-sixth slices SLICE43 to SLICE46 based on the input image data IDAT_USL3 for the third slice region USL3, and may not drive the first to fourth slices SLICE1 to SLICE4, the ninth to twentieth slices SLICE9 to SLICE20, the twenty-seventh to forty-second slices SLICE27 to SLICE42 and the forty-seventh and forty-eighth slices SLICE47 and SLICE48. That is, in the second frame period FP2, the panel driver 620 may drive only the slices SLICE5 to SLICE8, SLICE21 to SLICE26 and SLICE43 to SLICE46 that are designated to be updated by the panel region update command PRUCMD and the plurality of slice update commands SLUCMD1 to SLUCMD6, may not receive the input image data IDAT for the slices SLICE1 to SLICE4, SLICE9 to SLICE20, SLICE27 to SLICE42, SLICE47 and SLICE48 that are designated not to be updated by the region update command PRUCMD and the plurality of slice update commands SLUCMD1 to SLUCMD6, and may not drive the slices SLICE1 to SLICE4, SLICE9 to SLICE20, SLICE27 to SLICE42, SLICE47 and SLICE48 that are designated not to be updated.

In the second frame period FP2, the panel driver 620 may receive a panel region update command PRUCMD having a value of "110" indicating that the first panel region PR1 is not updated and the second and third panel regions PR2 and PR3 are updated from the host processor 200. Further, in some embodiments, the panel driver 620 may receive a slice reset command SLRCMD instead of the plurality of slice update commands SLUCMD1 to SLUCMD6 from the host processor 200. The slice reset command SLRCMD may indicate that all slices SLICE17 to SLICE48 included in at least one panel region PR2 and PR3 designated to be updated by the panel region update command PRUCMD are updated. Thus, in a third frame period FP3 after the second frame period FP2, the panel driver 620 may receive input image data IDAT_PR2 and IDAT_PR3 for the second and third panel regions PR2 and PR3 designated to be updated by the panel region update command PRUCMD from the host processor 200, and may drive all slices SLICE17 to SLICE48 included in the second and third panel regions PR2 and PR3 based on the input image data IDAT_PR2 and IDAT_PR3. Further, in the third frame period FP3, the panel driver 620 may not receive input image data IDAT for the first panel region PR1, and may not drive the slices SLICE1 to SLICE16 included in the first panel region PR1.

Accordingly, the display device 600 according to embodiments may drive the plurality of slices SLICE1 to SLICE48 at different driving frequencies not only in a first mode (e.g., a command mode) in which the input image data IDAT received from the host processor 200 are stored in the frame memory 660, but also in a second mode (e.g., a video mode) in which the input image data IDAT received from the host processor 200 are not stored in the frame memory 660.

Figure 14:
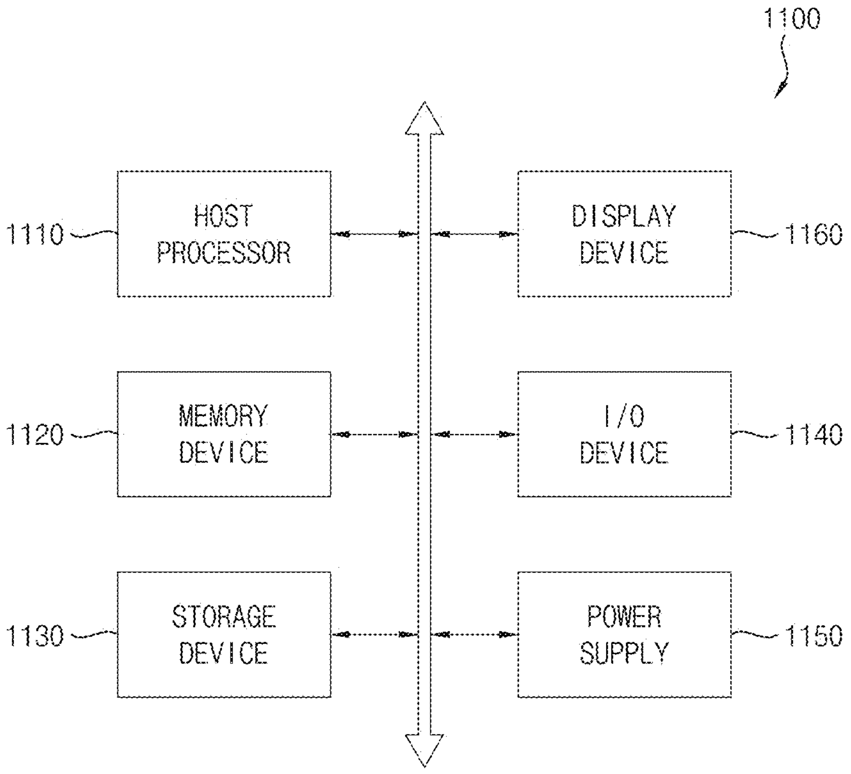
FIG. 14 is a block diagram illustrating an electronic device including a display device according to embodiments.

FIG. 14 is a block diagram illustrating an electronic device including a display device according to embodiments.

Referring to FIG. 14, an embodiment of an electronic device 1100 may include a host processor 1110, a memory device 1120, a storage device 1130, an input/output ("I/O") device 1140, a power supply 1150, and a display device 1160. The electronic device 1100 may further include a plurality of ports for communicating with a video card, a sound card, a memory card, a universal serial bus ("USB") device, other electric devices, etc.

The host processor 1110 may perform various computing functions or tasks. The host processor 1110 may be an application processor ("AP"), a microprocessor, a central processing unit ("CPU"), etc. The host processor 1110 may be coupled to other components via an address bus, a control bus, a data bus, etc. Further, in some embodiments, the host processor 1110 may be further coupled to an extended bus such as a peripheral component interconnection ("PCI") bus.

The memory device 1120 may store data for operations of the electronic device 1100. In an embodiment, for example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc.

The storage device 1130 may be a solid state drive ("SSD") device, a hard disk drive ("HDD") device, a compact disc-read only memory ("CD-ROM") device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

The display device 1160 may receive an MFD enable command, a boundary setting command and/or a panel region update command from the host processor 1110, and may drive only a portion of the display panel by receiving input image data only for the portion of the display panel in a subsequent frame period. Accordingly, the display device 1160 may drive panel regions at different driving frequencies in a mode (e.g., a video mode) in which the input image data are not stored in a frame memory.

Embodiments of the invention described above may be applied any electronic device 1100 including the display device 1160, for example, a mobile phone, a smart phone, a virtual reality ("VR") device, a television ("TV") (e.g., a digital TV, a three-dimensional ("3D") TV, etc.), a wearable electronic device, a personal computer ("PC") (e.g. a laptop computer, a tablet computer, etc.), a home appliance, a personal digital assistant ("PDA"), a portable multimedia player ("PMP"), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel; and a panel driver which drives the display panel, wherein the panel driver receives a multi-frequency driving enable command from a host processor, wherein, in a first frame period, the panel driver receives a panel region update command dividing the panel into a plurality of panel regions, the panel region update command further including a boundary setting command indicating a boundary between a first panel region and a second panel region of the plurality of panel regions from the host processor, wherein, in a second frame period after the first frame period, the panel driver receives input image data for the first panel region from the host processor, does not receive the input image data for the second panel region from the host processor, drives the first panel region based on the input image data for the first panel region, and does not drive the second panel region; and wherein a number of bits of the panel region update command is based on a number of panel regions in the plurality of panel regions into which the display panel is divided.

2. The display device of claim 1, wherein, in the second frame period, the panel driver provides data voltages and scan signals to the first panel region to drive the first panel region, and does not provide the data voltages and the scan signals to the second panel region not to drive the second panel region.

3. The display device of claim 1, wherein, in the second frame period, the panel driver drives the first and second panel regions at different driving frequencies in a mode in which the input image data received from the host processor are not stored in a frame memory included in the display device.

4. The display device of claim 1, wherein the first panel region is an upper panel region located over the boundary indicated by the boundary setting command, and the second panel region is a lower panel region located under the boundary, and Wherein, in the second frame period, the panel driver drives the upper panel region at a first driving frequency, and drives the lower panel region at a second driving frequency lower than the first driving frequency.

5. The display device of claim 1, wherein the panel driver includes:

a multi-frequency driving enable register which stores a value of the multi-frequency driving enable command, and wherein the panel driver generates a multi-frequency driving enable signal based on the value stored in the multi-frequency driving enable register.

6. The display device of claim 1, wherein, in a first portion of an active period of the second frame period allocated to the first panel region, the panel driver periodically receives a horizontal synchronization packet from the host processor, and wherein, in a second portion of the active period of the second frame period allocated to the second panel region, the panel driver does not receive the horizontal synchronization packet from the host processor.

7. The display device of claim 6, wherein, in the second portion of the active period of the second frame period, a data lane between the host processor and the panel driver is in a low power state indicating that no data is transferred.

8. The display device of claim 1, wherein the panel driver compares first input image data received in a previous frame period with second input image data received in a current frame period, and transfers a tearing effect signal to the host processor when the second input image data are different from the first input image data.

9. The display device of claim 8, wherein the host processor retransfers the second input image data to the panel driver in a next frame period in response to the tearing effect signal.

10. The display device of claim 8, wherein the host processor compares a number of first line data included in the first input image data with a number of second line data included in the second input image data, and determines that the second input image data are different from the first input image data when the number of the second line data is different from the number of the first line data.

11. The display device of claim 10, wherein the host processor compares a first check value of the first input image data with a second check value of the second input image data when the number of the second line data is equal to the number of the first line data, and determines that the second input image data are different from the first input image data when the second check value is different from the first check value.

12. A display device comprising:

a display panel; and a panel driver which drives the display panel, wherein the panel driver receives a multi-frequency driving enable command from a host processor, wherein, in a first frame period, the panel driver receives a panel region update command indicating whether each of a plurality of panel regions is updated, and at least one boundary setting command indicating at least one boundary between the plurality of panel regions from the host processor, wherein, in a second frame period after the first frame period, the panel driver receives input image data for a panel region designated to be updated by the panel region update command, among the plurality of panel regions from the host processor, and drives the panel region designated to be updated based on the input image data; and wherein a number of bits of the panel region update command is determined based on a number of the plurality of panel regions into which the display panel is divided.

13. The display device of claim 12, wherein, in the second frame period, the panel driver does not receive the input image data for a panel region designated not to be updated by the panel region update command among the plurality of panel regions from the host processor, and does not drive the panel region designated not to be updated.

14. The display device of claim 12, wherein a number of bits of the panel region update command is equal to a number of the plurality of panel regions.

15. The display device of claim 12, wherein the plurality of panel regions includes a first panel region, a second panel region and a third panel region, and wherein the panel region update command includes a first bit indicating whether the first panel region is updated, a second bit indicating whether the second panel region is updated, and a third bit indicating whether the third panel region is updated.

16. The display device of claim 12, wherein, in the second frame period, the panel driver drives the plurality of panel regions at different driving frequencies in a mode in which the input image data received from the host processor are not stored in a frame memory included in the display device.

17. The display device of claim 12, wherein the panel driver compares first input image data received in a previous frame period with second input image data received in a current frame period, and transfers a tearing effect signal to the host processor when the second input image data are different from the first input image data.

18. The display device of claim 17, wherein the panel driver compares the first input image data with the second input image data based on the panel region update command, numbers of line data included in the first and second input image data, and check values of the first and second input image data.

19. An electronic device comprising:

a host processor which provides input image data; and a display device which displays an image based on the input image data, wherein the host processor transfers a multi-frequency driving enable command to the display device, wherein, in a first frame period, the host processor transfers a panel region update command dividing the panel into a plurality of panel regions, the panel region update command further including a boundary setting command indicating a boundary between a first panel region and a second panel region of the plurality of panel regions of the display device to the display device, wherein, in a second frame period after the first frame period, the host processor transfers the input image data for the first panel region to the display device and does not transfer the input image data for the second panel region to the display device, and the display device drives the first panel region based on the input image data for the first panel region and does not drive the second panel region; and wherein a number of bits of the panel region update command is determined based on a number of the plurality of panel regions into which the display panel is divided.

* * * * *